US008542871B2

(12) United States Patent
Voloshynovskiy et al.

(10) Patent No.: US 8,542,871 B2
(45) Date of Patent: *Sep. 24, 2013

(54) BRAND PROTECTION AND PRODUCT AUTHENTICATION USING PORTABLE DEVICES

(75) Inventors: Sviatoslav Voloshynovskiy, Geneva (CH); Oleksiy Koval, Geneva (CH); Thierry Pun, Geneva (CH)

(73) Assignee: University of Geneva, Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,396

(22) Filed: Aug. 9, 2012

(65) Prior Publication Data

US 2012/0298743 A1 Nov. 29, 2012

Related U.S. Application Data

(63) Continuation of application No. 11/477,486, filed on Jun. 30, 2006, now Pat. No. 8,249,350.

(51) Int. Cl.

| | |
|---|---|
| ***G06K 9/00*** | (2006.01) |
| ***B42D 15/00*** | (2006.01) |
| ***H04N 1/40*** | (2006.01) |
| ***G09C 3/00*** | (2006.01) |
| ***H04L 9/32*** | (2006.01) |

(52) U.S. Cl.
USPC ............ 382/100; 283/113; 358/3.28; 380/54; 713/176

(58) Field of Classification Search
None
See application file for complete search history.

(56) References Cited

U.S. PATENT DOCUMENTS

| | | | | |
|---|---|---|---|---|
| 6,983,057 | B1 | 1/2006 | Ho et al. | |
| 7,000,113 | B1 * | 2/2006 | Linnartz | 713/176 |
| 7,283,630 | B1 * | 10/2007 | Doljack | 380/55 |
| 7,644,281 | B2 | 1/2010 | Deguillaume et al. | |
| 7,664,274 | B1 | 2/2010 | Graumann | |
| 8,249,350 | B2 * | 8/2012 | Voloshynovskyy et al. | 382/181 |
| 2002/0146146 | A1 | 10/2002 | Miolla et al. | |

(Continued)

FOREIGN PATENT DOCUMENTS

| | | | |
|---|---|---|---|
| RU | 2 132 569 | C1 | 6/1999 |
| RU | 2 181 503 | C1 | 4/2002 |

OTHER PUBLICATIONS

Choubassi et al., "A New sensitivity analysis attack", Proc. SPIE Conf., San Jose, CA, USA, Jan. 2005, University of Illinois, Beckman Institute and ECE Department, 12 pages.

(Continued)

*Primary Examiner* — Nirav G Patel
(74) *Attorney, Agent, or Firm* — Patterson Thuente Pedersen, P.A.

(57) ABSTRACT

A method and apparatus for protection of products and packaging against counterfeiting using dedicated authentication protocol coupled with portable devices. It is based on the product identification information, i.e., PIN, generated by the product manufacturer, stored in the product database and added to product or packaging in an open and/or a hidden form. The open part is directly available to the consumer before buying, opening or consuming the product or package or damaging its integrity while the hidden part is only revealed after these operations. The hidden information can also be disappearing after a predefined interval of time or number of trials or usages. Both parts are communicated to the authentication server in a predefined order to verify the product or package authenticity. The presence, absence, or multiple requests for the same product PIN, confirm or reject product authenticity or detect attempt at attacking the system or using counterfeited products.

26 Claims, 10 Drawing Sheets

(56) References Cited

U.S. PATENT DOCUMENTS

| | | | | |
|---|---|---|---|---|
| 2003/0136837 | A1 | 7/2003 | Amon et al. | |
| 2003/0219143 | A1 * | 11/2003 | Moskowitz et al. | 382/100 |
| 2005/0160271 | A9 * | 7/2005 | Brundage et al. | 713/176 |
| 2005/0180598 | A1 | 8/2005 | Stone et al. | |
| 2005/0213790 | A1 | 9/2005 | Rhoads et al. | |
| 2006/0075238 | A1 | 4/2006 | Manders et al. | |
| 2006/0147083 | A1 * | 7/2006 | Piersol et al. | 382/100 |
| 2006/0230276 | A1 | 10/2006 | Nochta | |
| 2007/0000994 | A1 * | 1/2007 | Michelassi et al. | 235/379 |
| 2007/0022294 | A1 * | 1/2007 | Lapstun et al. | 713/176 |

OTHER PUBLICATIONS

Comesaña et al., "An Information-Theoretic Framework for Assessing Security in Practical Watermarking and Data Hiding Scenarios", Signal Theory and Communications Dept., University of Vigo—Spain, Montreux, Switzerland, Apr. 2005, 4 pages.

Comesaña et al., "Blind Newton Sensitivity Attack", IEE Proceedings on Information Security, 153(3), Sep. 2006, pp. 1-30.

Cover et al., "Elements of Information Theory", John Wiley & Sons, Inc., USA, 1991, 36 pages.

Gel'Fand et al., "Coding for Channel with Random Parameters", Problems of Control and Information Theory, vol. 9(1), pp. 19-31, 1980, USA.

Kutter et al., "The Watermark Copy Attack", Proceedings of SPIE: Security and Watermarking of Multimedia Content II, vol. 3971, Jan. 2000, pp. 1-10, USA.

Pérez-Freire et al., "Secret dither estimation in lattice-quantization data hiding: a set-membership approach", Signal Theory and Communications Dept., University of Vigo, 2006, 12 pages, Spain.

Application and File history for U.S. Appl. No. 11/477,486, filed Jun. 30, 2006. Inventors: Voloshynovskiy et al.

* cited by examiner

BRAND PROTECTION AND PRODUCT AUTHENTICATION USING PORTABLE DEVICES

RELATED APPLICATION

This application is a continuation of application Ser. No. 11/477,486 filed Jun. 30, 2006, which is hereby fully incorporated herein by reference.

BACKGROUND OF THE INVENTION

Protection of valuable goods, products and brands has always been a key requirement of modern markets. The rapidly developing field of nanotechnologies, the recent advances in relatively cheap multimedia devices providing high resolution scanning, printing and high volume storage as well as the use of digital technologies, networks and computers recently revealed unprecedented security threats, counterfeiting and unauthorized distribution leading to an strong need for efficient solutions for products and goods authentication. Authentication is defined as the process of verification of added specific overt, covert or forensic features added to the product, package, label or of the identification of a component within a product or package that may verify the product or packaging as genuine. The solution to the problem of product protection against counterfeiting is highly dependent on the clear definition of risk factors incurred by the company or brand as well as by the end-users. Among the major risk factors, the most important are threats related to the counterfeiting of products, refillment of original packaging, goods tampering, illegal trading, production of look-like products, illegal franchising or any mixture of the above ones.

The above threats have very important impact on both consumers and legitimate manufacturers regarding mostly: (a) health, safety, financial or legal damages as well as abuse of consumers rights because of non-genuine products in any form of consumption, (b) reputation of manufacturer and loss of confidence of consumers with respect to the corresponding product or even brand in general, that result in the loss of sales and damage to business, (c) direct loss of sales and even of a part of market due to the presence on the market of competitive non-genuine products.

The problem of product authentication is mainly complicated due to existing schemes of international economy and distributed manufacturing and is determined in part by the chain of manufacturer-distributor-reseller-consumer. The main factors that complicate the efficient solution of product protection are:

(a) international or multiregional character of the above chain, i.e., the products produced in one county or region can be consumed in another one;

(b) sophisticated and non-uniform rules and laws of different countries;

(c) no possibility of efficient centralized control of the chain manufacturer-distributor-reseller-consumer. Essentially it concerns the difficulty of regular and mass inspection of goods in selling points by the inspections bodies trusted by the manufacturer due to the above mentioned reasons of non-uniform laws, logistics of product distribution, storage and sell as well as economic attractiveness;

(d) the protection schemes and authentication devices are often based on proprietary (in the sense of non-cryptographic) principles that results in the difficulty of their broad distribution, in quite high price and finally in limited availability to every selling point where the consumer ought to be able to verify the product;

(e) the absence of direct control of the product manufacturer over all international resellers. Once the reseller obtains a license from the manufacturer or distributor to sell N items of some product or brand, he/she can try to sell at the same time K non-genuine items of the above product or brand under the cover of the obtained license. In many cases, the end-consumer is unable to distinguish the counterfeited product or replica from the genuine, since the quality of replicas and level of counterfeiting was considerably increased during last years. Moreover, in most recent cases, the equipment of replica producers is either at the same level or even of the same origin as the original manufacturer's. In some cases, the components of goods and products of replica manufacturers have the same origin as those of original one and even sophisticated expert analysis meets difficulties in distinguishing between original and its replica. We will refer to such replica manufacturers as gray ones;

(f) even if the authentication devices are available at the selling points or pay desks, it is very likely that they will be damaged or their normal functioning will be sabotaged or the even fact of such an authentication might be hidden from the consumer by reselling personnel due to the above reasons;

(g) on the technical side of the authentication scheme and device design it should also be unfortunately acknowledged that no a single security feature can be considered completely resistant to all criminal attacks. Given enough time, money and efforts, almost any feature could be reproduced. This again recalls the need to use practically approved cryptographic principles potentially combined with multiple features and multifunctional security devices;

(h) the authentication devices designed to detect the security features are often quite expensive for the end-consumers, the procedure of authentication is quite complex and timely, the proprietary nature of security features restricts at the same time the broad distribution of such devices, finally the stand-alone functional aim of the authentication device, i.e., the fact that it can only be used for the authentication of a given product, is not very attractive for the majority of consumers who do not often buy a given product thus do not need to keep such a device nearby;

(i) finally, authentication devices are not sufficient by themselves without appropriate protocols and broad public popularization of such a possibility or even additional consumer motivation to perform the authentication check.

Thus, there is a great need in efficient protocols, methods and tools to prevent counterfeiting and to motivate consumers to only use genuine products. This problem is still open and very challenging due to the above reasons. At the same time, the protection should be cheap and well suited to the manufacturing process in both mass-market and luxury segments. Simultaneously, it should be available to every consumer disregarding the country or region, time and place and should not require any special devices based on proprietary technology. Contrarily, it is highly desirable to design such a technology that can be based on public devices that are also at the disposal of most potential consumers and are independent of sellers or distributors. All these conflicting requirements should be simultaneously satisfied. It is not always the case and a compromise solution should be proposed.

Therefore, we consider an alternative cryptographic-based approach modifying the basic principles of common authentication protocols. Further, on-line product authentication based on technical capabilities of portable devices available to the majority can represent a reasonable trade-off for many practical scenarios described above. Finally, to cope with the cryptographic-based principles it is beneficial not to rely on security features that are based on physical properties of materials that are either known to a small number of professionals or are difficult to replicate. In any case, the above-described factors (i.e., mostly every feature can be counterfeited with sufficient time and money, these devices/security features are expensive in both manufacturing and verification and not available to everyone, the public presence of verification devices is not desirable or justifiable for various above reasons) restrict their broad practical usage.

Therefore, it is highly desirable to construct such a protocol, where using on the products or packaging simple features that might even be insecure in nature and the devices available to everyone, potentially even without any special security equipment or software inside, to enable real time, cheap and reliable authentication of products and brands in any place and time with the elements of consumer stimulation of performing this action by proposing the various bonuses, prizes, stimulating cost reductions for the bought products or the services used in the authentication protocol.

To be fully compliant with the above requirements of the availability of authentication services to every consumer at any time, it is beneficial to consider the protocol based on portable devices. US Patent No 2003/0136837, filed Jun. 22, 2001 and published Jul. 24, 2003 [1] discloses a method and a system for the local and remote authentication of an item, in particular a security document, with the help of an authenticating device, comprised in, connected to, or linked to mobile communication equipment. The described item carries a marking exhibiting a characteristic physical behavior in response to interrogating energy, such as electromagnetic radiation and/or electric or magnetic fields. The idea behind usage of markers with the characteristic physical behavior that can be coded or not and are difficult to obtain or to produce is to confer the item resistance against counterfeiting. The authentication device should be equipped by a corresponding sensor that can perform the verification either locally, i.e., directly on the portable device, or remotely using on-line access to the remote server. In the case of local verification, the corresponding software and/or database should be either installed on a Java card or uploaded prior to the verification. Although, the basic idea is compliant with the above requirements, the described method of product authentication has some open issues. First, the portable device should be equipped with a special sensor capable to communicate with the above anti-copying security materials. This raises two serious concerns. The first one is related to the fact that the sensors should be mass-scale integrated into the portable devices of various manufacturers; this might raise various practical difficulties regarding standardization, price of portable devices, energy consumption, weight, and consumer's reluctance to have some not often used features in their equipment. Secondly, to perform the authentication according to the described local protocol one has either to download the corresponding software or to use specially prepared security cards. In most cases, the software installation on portable devices by ordinary consumers is not likely due to the infrequent need in product authentication. Moreover, there is an important diversity of portable devices, of their operating systems, programming and software. This makes the process of developing verification software quite complex, expensive and slow with respect to new updates. Additionally, consumers with frequent need in authentication will more likely prefer secure smart cards based solutions on their mobile devices. However, even in this case the device should have regular access to a database for updates of the new products. Moreover, the disclosed protocol does not address the important issue of the database update according to the information about performed product requests or the fact of product consumption. A serious threat is the duplication of the product IDs once the proprietary information carried by the physical material is discovered or decoded. This task is also facilitated for the counterfeiter by the availability of sensors in public portable devices.

An idea similar in spirit was disclosed in Patents No 2002/0146146 [2] and No 2005/0213790 [3], using either portable devices equipped with optical cameras or computers connected to the web-cameras capable to capture digital watermarks and connected via internet with the product ID database, where the watermark is considered to be a security feature difficult to copy. Although, Patent 2002/0146146 enables the connection with the product ID database, the need of stationary web-camera and regular Internet connection seriously restricts the usage of the disclosed invention. According to the second patent [3], one can benefit from wireless communications using portable devices in the protocol requiring the interaction between the product and database. Therefore, one can envision potential combination of techniques claimed in these two patents to achieve the desirable goal similarly to [1] with the only difference of using digital watermarks instead of secure physical materials. However, even in this case the above-mentioned shortcomings of the proposed protocol are not completely resolved. In particular, one is facing the same problem with the software installation to perform authentication and the issue with the database update with respect to the requested product information. Moreover, the main security load is put on the digital watermark instead of on materials with the special physical properties. It is assumed that the watermark cannot be reproduced from the printed data. However, it was demonstrated that most of spread spectrum-based digital watermarking techniques are vulnerable to the so-called copy attack [4]. The main idea behind the copy attack is a possibility to predict the watermark from an image (even without the knowledge of the used secret key), enhance it and copy to another product image or logo. New recent studies additionally revealed that quantization-based data-hiding techniques are even more vulnerable to such kind of attacks since they are characterized by higher security leakages [5, 6]. Moreover, the sensitivity attack can be efficiently used to reveal the secret information with the available detector/decoder, which is the case for the considered application, and then the copy attack can be successfully applied [7, 8]. Therefore, it is highly unlikely that solely current digital watermarking technology can resolve the issue of reliable document authentication.

It should also be pointed out that once the security features of physical materials are disclosed, one could reproduce the product, packaging or label in any desired quantity. This threat can be over passed providing the possibility to a consumer to consult the database according to the described protocols and obtain the confirmative or negative answer concerning product authenticity.

A similar idea is also described in RU Patent number RU 2181503, filed Jul. 30, 2001 and published Apr. 20, 2002 [9] where the index generated from a random numbers generator is assigned to every product that is stored in the database and printed on the product, packaging or label. Additionally, the telephone number or Internet address are indicated on the product or label. An opaque erasable film covers the index. After purchase the consumer removes the opaque layer and sends the index to the control service. The product authenticity is decided based on the comparison of the communicated index and the index stored in the database. A similar idea with coded information in the form of barcodes is described in the RU patent No RU 2132569, filled Nov. 11, 1998 and published Jun. 27, 1999 [10]. The described way of product ID communication to the server in the case of telephone call described in [9] consists in establishing the communication with the database via phone call and dialing the product ID after opaque film removal during the call. The result of the verification of the dialed number with the database is pronounced to the caller. Thus, the number is introduced manually only after removing opaque film, i.e., after damaging the integrity of the product, and the spelled confirmation is not stored by the consumer. Moreover, the database is not updated according to the request and the caller information is not registered and stored (for various security and promotion reasons that will be disclosed below). This interaction protocol represents a number of serious security concerns regarding the protocol in general as well as the way a particular product index is communicated. First, once the product ID is disclosed for any reason it is publicly available and nothing prevents counterfeiters to copy on the other products covering it with the opaque film. Every authentication request generated based on the faked product that is sent to the indicated telephone number or Internet address would then confirmative. Secondly, the product can only be authenticated after purchase, which complicates the procedure of the product return, replacement or even compensation. Moreover, the consumer has no confirmation that he has checked the claimed product from a given mobile device since he/she does not receive any sort of certificate message or proof. Thirdly, since some products are manufactured in quantities in the order of millions, the product index can be quite lengthy for the manual input/communication. This raises two serious concerns: the motivation of consumer to input such lengthy indices especially in cases when several items are bought will be low, and the probability that the typed/dialed index be correctly retyped from the product or packaging is not 100%. It should be pointed out that no form of coding was assumed to tackle with these issues.

SUMMARY OF THE INVENTION

The invention described here concerns both a method and an apparatus for the protection of products and packaging against counterfeiting using a dedicated authentication protocol coupled with portable devices. In this disclosure, the product identification number (PIN) is generated by the product manufacturer, stored in the product database and added to product, packaging or label in open and/or hidden form. The open part is directly available to the consumer before the purchase, opening or consumption of the product or package or the damaging of its integrity while the hidden part can be revealed after. The hidden information can also be disappearing after a defined interval of time or number of trials or usages. Both parts are communicated to an authentication server in the defined order to verify the product or package authenticity. The fact of presence, absence, or multiple requests for the same PIN, confirms or rejects product authenticity and allows detect attempts to attack the system or to use counterfeited products.

Therefore the major advantages of the proposed invention can be summarized as follows:

1) The request for the product authentication is performed from a portable device (mobile phone, PDA, Palm, Pocket PC, Smartphone, or any other equipment with communications and computing facilities) before and after product purchase based on open and/or hidden parts of a PIN with the registration of the authentication request data (phone number, IP address, email, time as well as PIN open and hidden parts) in the request database. This avoids the possibility of reusing the disclosed PIN for faked products or packaging. Requests based on the open part of the PIN can be performed before the pay desk thus preserving product integrity and avoiding any complication in the case of non-confirmative reply, or if the consumer has finally decided not to buy the product.sctn. The authentication based on the hidden PIN part can be performed after product purchase and will inform the database about the fact that the product has been bought or used.

2) Contrarily to approaches for anti-copying protection based on materials with special physical properties or digital watermarks caring information about the PIN, no such properties are required in the proposed invention due to the above protocol of requesting PIN registration in the special database. At the same time, no proprietary information is required and the protocol is solely based on cryptographic principles.

3) Due to the inherently passive nature of physical materials or watermarks, which can be scanned from the package or product multiple times, we appositively propose to use "active" materials or means to encode the PIN, which can reveal the encoded or stored information only certain predefined number of times thus avoiding the re-usage of the product or packaging for various counterfeiting purposes. It can be also considered that either materials/means are losing their properties after revealing or disclosing information or are self-destructive under certain conditions. Additionally, it can be considered that the devices can reproduce the signal only certain number of times due to the limited life-time of built in power source or discharge of the capacitor or any corresponding means.

4) Contrarily to the previous inventions where the information about the PIN should be acquired using either special sensors (case of physical materials) or corresponding digital cameras with high resolution and low level of geometrical aberration and linear contrast (anti-copying digital watermarks) or dialed/typed from a portable device with potential errors that might cause wrong authentication result, we propose to use ordinary portable communication devices equipped either with microphone, habitual input means for alphanumeric information or low-resolution cameras that one can find in the majority of currently available mobile phones or PDAs. The enhancement of performance and reduced requirements to the acquisition equipment in our case (it might be manual by means of a keyboard, oral using an internal microphone or performed by a camera with consecutive optical character recognition (OCR)) are due to the use of encoded alphanumeric symbolism using error correction codes. Another advantage comes from the usage of encoded audio signals reproduced by various means in front of the microphone of the portable device as well as from the combination of visual or audio encoded information considered to be the host data with digital watermarks. All these allow faster data input, reliable communication of essentially longer amount of information, higher security with respect to the regeneration of PINs by exhaustive search attacks as well as more natural and attractive form of interaction between the product and portable devices via habitual communications channels. At the same time, the devices, which are not equipped by the cameras, or even traditional fixed phone network communications can be used by the consumers, who for some reason do not possess the portable devices at the moment of authentication.

5) By registering the device identifier from which the authentication request is performed, one obtains the advantage of controlling and preventing attempts to attack the system at the product and/or server levels, track the information about the requests performed based on the open and hidden PINs thus providing system confirmation about the initial and final product checking, opening or consumption. By registering the number of successful checks of different product items from a given portable device, one can award the device holder with special product price reductions, sales, participation in the various lotteries or granting the portable device owner some extra free services, e.g., some extra free call time or messaging or other possibilities to motivate the authentication demands.

6) Contrarily to the previously considered state-of-the-art approaches, we also propose to send the consumer the authentication report in the form of encoded and/or encrypted information (text message, audio signal, encoded symbologies including barcodes or text, image or audio with some hidden information), containing information about requesting device, PINs and time/date stamp, for various confirmation purposes for both the consumer and manufacturer in order to enhance the protection of both parties against counterfeiting attacks at various protocol levels.

7) The proposed approach does not require any special software installation or device reconfiguration for switching from its normal operating mode to the authentication one and can be performed on essentially any device using standardized communication protocols. In the case of authorized auditors performing authentication verification, the proposed technique is easily applicable either on solely portable devices without the need to contact any authentication server in general or just sending the result of preliminary data processing or extraction via standardized communication protocol.

The present invention principally targets any goods, physical objects or materials, needed to be protected against counterfeiting. The invention can be applied to (but is not limited to) the following applications: anti-counterfeiting, brand protection, tracking, tracing, quality and integrity control, market study, product promotion and lotteries. Targeted products and goods include (but are not limited to) various luxury goods (watches, jewelry, cigarettes, alcohol, closing and footwear etc.), pharmaceutical products, consumer or household products, various electronic and mechanic equipment or some of their components, as well as labels, tags, packaging, boxes, shipping invoices and various printed documents associated with the product that are used for the product authentication or certification. The authentication information can be reproduced by various printing technologies such as ink jet, solid-ink, laser-, intaglio-, letterpress-, offset-, screen-, gravure-flexo-graphic printing or coating techniques. The audio information coded or random can be reproduced by various transducers that convert electrical energy to audible vibrations, mechanical, electromechanical, piezoelectric or magnetic buzzers, tweeters, dynamic speakers, piezo-elements without oscillator (implemented in CMOS and TTL logic, GPIO pin toggled in an audio rate) or direct digital synthesizer, non-uniform coded surfaces producing sounds using various on/off, amplitude, phase or frequency modulation or combination of them. Portable devices can be any user device equipped by some computational facility with sufficient memory and data storage and/or communications facilities enabling communications with the authentication server as well as equipped with the sensors such as microphone, optical camera operating in the visible spectrum and potentially working in IR/UV mode, barcode reader, character scanner in the form of any hand-held device, RFID reader, and other peripheral input/output devices (key board, voice dial, touch screen and tablet, stroke counting, pressure sensitive digitizer, tactile input, kinesthetic input).

BRIEF DESCRIPTION OF THE DRAWINGS

The invention may be more completely understood in consideration of the following detailed description of various embodiments of the invention in connection with the accompanying drawings.

DETAILED DESCRIPTION OF THE DRAWINGS

The invention proposes a novel brand protection protocol based on portable devices that might be applied to various kinds of goods and products and targets verification of their authenticity. The authentication verification is performed based on the two kinds of secure information, two parts of a PIN, uniquely identifying the product, i.e., open and hidden parts of PIN stored on the product surface, packaging, label etc. and reproduced either by analog or digital printing, laser engraving or audio reproduction devices using audio modulation of speech, vibro, piezoelectric sounds or any other suitable principles of sound generation. The hidden part of the code might be encoded and encrypted in order to enhance the security of the proposed protocol. Accordingly to the structure of the authentication information, the authenticity verification undergoes two main stages referred to as inside shopping area verification and outside shopping area verification. At the inside shopping area verification stage the open part of the security code is directly retrieved from a storage location by any input means available on the portable device (keyboard, microphone, video camera, etc.) and will be compared on the authentication server to the corresponding data stored in the database. There are three kinds of databases involved in the protocol, a database of open parts of secure codes, a database of hidden parts of secure codes and a database of user requests. The databases of secure information have such a structure that every field in a database of the open secure codes has a unique correspondent in the database of hidden secure PINs and vice-versa.

System Architecture

Figure 1:
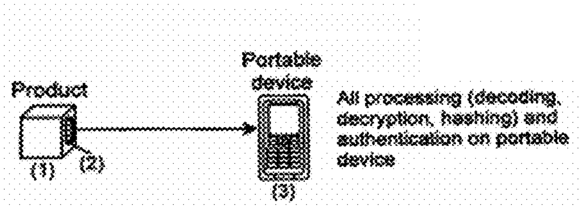
FIG. 1: An embodiment for the proposed algorithm addressing the brand protection and product authentication using portable devices for the particular protocol setup supposing that all the necessary processing (decoding, decryption, hashing) and authentication procedures are performed on a consumer portable device (mobile phone, Pocket PC, Smartphone, PDA, Palm, etc.). The product (item 1) contains the uniquely assigned identification information (2) that is located on its surface, packaging, attached label or certificate. The identification information (2) is captured by standard acquisition (digital camera, microphone) or input (keyboard) means integrated into the portable device (3). The obtained information in the form of a typed text, digital photo in one of available graphic formats, audio sequence is processed thereafter by means of a locally available software that depending on the particular protocol configuration will perform the necessary operations like decoding, decryption, feature extraction or hashing. The output of the processing stage enters the authentication stage where its content is compared to the data available in the local database. Depending on the result of this comparison that is performed as the optimal solution of the multiple hypothesis testing problem or using optimal maximum likelihood/maximum a posteriori probability/sequential decoding in the decoding problem the message authenticity confirmation or rejection is generated and activated through the portable device output means (i.e., display, loudspeaker, vibro) in several possible forms that will be detailed thereafter. Depending on the result of verification procedure, the database is updated accordingly.
Figure 2:
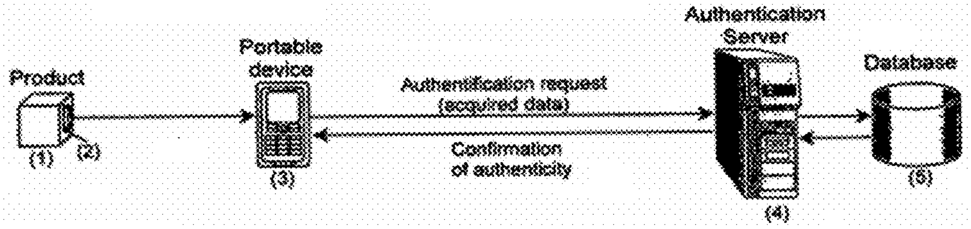
FIG. 2: An embodiment for the proposed algorithm addressing the brand protection and product authentication using portable devices for the particular protocol setup supposing that all the necessary processing (decoding, decryption, hashing) and authentication procedures are performed on a remote server. The portable device is uniquely used for data acquisition, its communication to the remote server, reception of the verification results and their communication to the consumer. As in the case of FIG. 1, the identification information (2) uniquely assigned to a product (1) and located on its surface, packaging, attached label or certificate is captured by standard acquisition (digital camera, microphone, etc.) or input (keyboard) means integrated into the portable device (3). The obtained information in the form of a typed text, digital photo in one of available graphic formats, audio sequence is used to compose a request transferred to the remote authentication server (4) as in the body of SMS, MMS, EMS, email, voice message or directly via audio video channels using BlueTooth, WLAN, WAP, i-mode, SMPP protocols within GSM, TDMA, CDMA, UMTC networks or any other messaging and communication facilities available. The server (4) receives the sent identification information and processes it thereafter by means of locally available software that depending on the particular protocol configuration will perform the necessary operations like decoding, decryption, feature extraction or hashing. The output of the processing stage enters the authentication stage where its content is compared to the data received from the hosted or remotely connected database (5) according to the sent request. Depending on the result of this comparison that is given as the optimal solution to a multiple hypothesis testing problem or using optimal maximum likelihood/maximum a posteriori probability/sequential decoding in the decoding problem the message authenticity confirmation or rejection is generated and transferred to the portable device in the body of SMS, MMS, EMS, email, voice message or directly via audio or video channels using BlueTooth, WLAN, WAP, i-mode, SMPP protocols within GSM, TDMA, CDMA, UMTC networks or any other messaging or communication facilities available. The received message is activated through the portable device output means mentioned before in several possible forms that will be detailed thereafter. The request information (phone number, IP address, email, time) as well as sent PIN are registered and the PIN database is updated accordingly.
Figure 3:
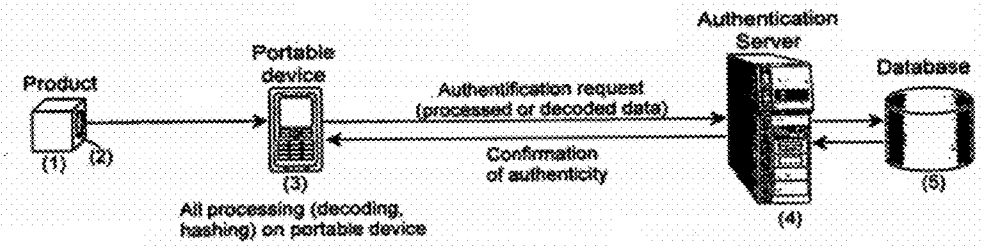
FIG. 3: An embodiment for the proposed algorithm addressing the brand protection and product authentication using portable devices for the particular protocol setup supposing that all the necessary processing (decoding, decryption, hashing) are performed on the portable device while the authentication procedure is accomplished on the remote server. This architecture is a hybrid version of architectures presented in FIG. 1 and FIG. 2. As in the case of FIG. 1, the identification information (2) uniquely assigned to a product (1) and located on its surface, attached label or certificate is captured by standard acquisition (digital camera, microphone, etc.) or input (keyboard) means integrated into the portable device (3). The obtained information in the form of a typed text, digital photo in one of available graphic formats, audio sequence is processed thereafter by means of a locally available software that depending on the particular protocol configuration will perform the necessary operations like decoding, decryption, feature extraction or hashing. The output of the processing stage is used to compose a request further communicated to the remote authentication server (4) as in the body of SMS, MMS, EMS, email, voice or video message using BlueTooth, WLAN, WAP, i-mode, SMPP protocols within GSM, TDMA, CDMA, UMTC networks or any other messaging or communication facilities available. The server (4) receives the sent request and passes it to the authentication stage where the request is compared to the data received from the hosted or remotely connected database (5). Depending on the result of this comparison that is given as the optimal solution of the multiple hypothesis testing problem or using optimal maximum likelihood/maximum a posteriori probability/sequential decoding in the decoding problem the message authenticity confirmation or rejection is generated and transferred to the portable device in the body of SMS, MMS, EMS, email, voice or video message using BlueTooth, WLAN, WAP, i-mode, SMPP protocols within GSM, TDMA, CDMA, UMTC networks or any other messaging or communication facilities available. The received message is activated by the portable device audio-visual or vibro means in several possible forms that will be detailed thereafter. Depending on the result of verification procedure, the database is updated accordingly.

Depending on the particular implementation of the protocol, three scenarios of authenticity verification are possible (FIG. 1-3). The system architecture presented in FIG. 1 is referred to as a local one that can be used for off-line verification. The system architecture presented in FIG. 2 is referred to as a remote one that can be used for on-line verification. The system presented in FIG. 3 is called the hybrid one and combines elements of the previous two systems. In the case of local architecture, when all databases as well as the authentication server are installed on a user portable device (FIG. 1), the corresponding data streams from both open and hidden secure PINs are compared on the portable device itself. The product (item 1) contains the uniquely assigned identification information (2) that is located on its surface, packaging, attached label or certificate. The identification information in the form of PIN (2) is captured by standard acquisition (digital camera, microphone) or input (keyboard) means integrated into the portable device (3) processed, verified and displayed on the same portable device. Other modifications of the authentication verification protocol configurations correspond to the setups when both the required computations (decoding, decryption), the databases and the authentication server are remote (FIG. 2) or while decoding/decryption is performed on the portable device and the databases and the authentication server are remote ones (FIG. 3).

Generalized Authentication Protocol

Figure 4:
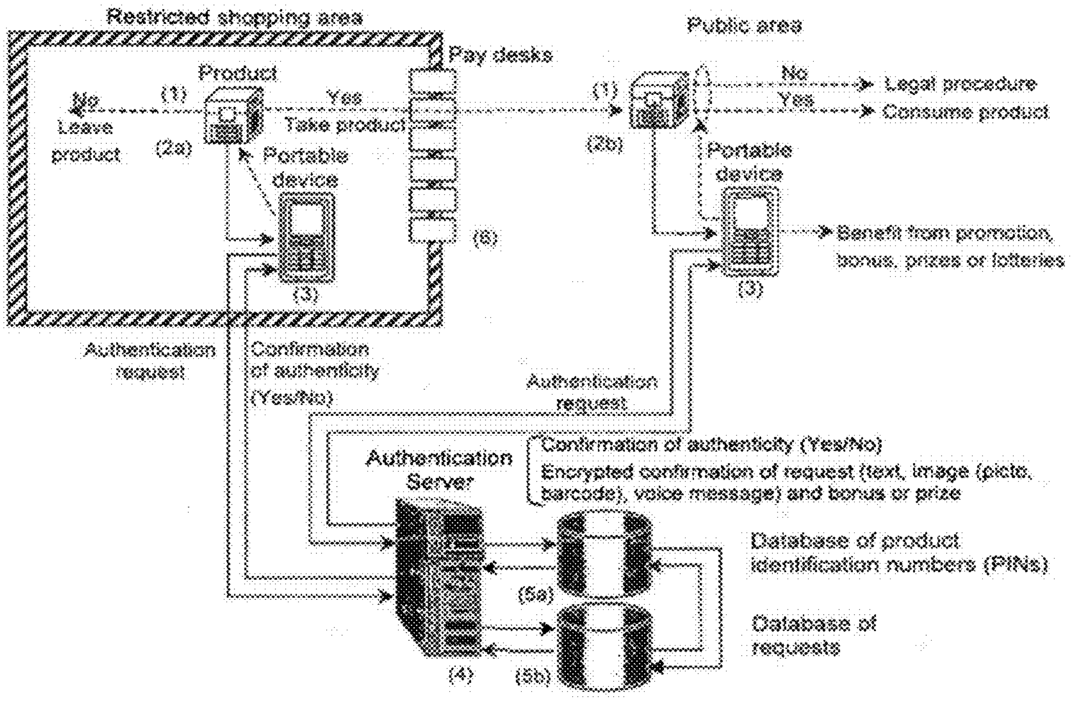
FIG. 4: Example of implementation of a protocol addressing the brand protection and product authentication using portable devices inside/outside a shopping zone. A consumer that is located within the restricted payment zone is selecting a product (1) of interest. The verification protocol consists of two parts: "inside restricted shopping area verification" and "outside restricted shopping area verification". In the "inside shopping area verification", prior to making a decision about the purchase, the open part of the identification information (2*a*) located on the product surface, its package or label is analyzed. Using a portable device (3) acquisition and transmission means this information is converted into an authentication request that is sent to the authentication server (4). The server processes the request accordingly and communicates the information to the database (5) that consists of two parts, i.e., database of PINs (5*a*) and database of requests (5*b*). The database (5) is playing a twofold role. The part containing the stored product PINs (5*a*) communicates to the server the response that certifies or rejects the requested product authenticity (i.e., the fact that such an item was produced under a certain brand and its PIN is in the database of the manufacturer). The part registering the received request information (5*b*) (the phone number or the caller PIN, a number of successful purchases, a number of outdated/illegal numbers sent from this phone number, request statistics, requested product PIN, etc.) provides to the server information about the existing user account if such exists or creates a new one. Finally, the server generates a composite feedback to be communicated to the consumer portable device that contains authenticity confirmation/rejection message as well as account status information. Upon receiving the message, the corresponding action informing the consumer about the result is activated on the portable device. In case the authenticity is certified, the user can proceed to the payment desk (6). In case the received information contains an authenticity rejection, a customer is free to leave the selected product on the shelf This finalizes the inside shopping zone verification. The outside verification stage is included into the protocol in order to enhance the security of the overall product authenticity verification since in the case of protocol construction based on the open access to the secure information some misuses are possible that open protection holes (like illegal in-shop duplication). The request for the verification based on the hidden part also indicates the fact that the product integrity has been damaged. This stage is based on information that is stored on the product package, its surface, label etc. not in an open way (hidden PIN (2*b*)). This information can be present in the printed or engraved form and hidden under the destructive part of the label or covered by a layer of secure inks It might be located on the internal side of the product package or be stored as an audio signal that can be reproduced by any suitable means. Moreover, this part can be designed in such a way that only a certain defined number of checks can be performed, since the mean or the mark can be destroyed. Having a paid product item, a consumer performs a necessary manipulation to access the hidden part of authentication information, acquires this information using means integrated into the portable device (keyboard, digital camera, microphone, etc.) and finally sends the request to the authentication server (4). The request is processed by the server (5) in the following way. First, based on the database of requests (5*b*), the portable device PIN (3) is verified if it is associated to the first authentication request that concerns the corresponding product according to the open PIN part. If there is no previous request concerning a given product based on the open PIN part, several practical situations might be considered: (a) the product was bought or delivered to the end consumer without verification based on the open PIN part; (b) an attempt to verify the product with the damaged integrity is performed. Both cases are registered in the database of requests (5*b*) and treated accordingly. In the case of authentic hidden PIN part and absence of previous requests, the user receives the confirmation with the corresponding warning that the open PIN part was not checked timely and that this purchase will not be counted for various promotion actions (like various discounts for future purchases of goods of the same brand as well as different actions dealing with portable device services; various prizes and lottery participations). In all opposite cases, the corresponding countermeasures are applied to inform the consumer about the potential danger of consuming non-authentic product or attempting to recheck the product whose integrity was under question. If there is a correspondence between the portable device identification data for the open and hidden parts of the PIN, the product authenticity is confirmed and the database is updated accordingly. Otherwise, the product authenticity is rejected. Depending on the taken decision, the server generates a message to be sent to the corresponding portable device in an encrypted form that finally can be organized as text message, pictograms, barcodes, noisy-like signal or any audio or video message. Besides the information certifying or denying the product authenticity the sent message contains some information that concerns the user requests statistics or bonuses, prizes or any form of promotion. This information contains, for instance, a number of made purchases based on both verification stages and might be used for the above various promotion actions (like various discounts for future purchases of goods of the same brand as well as different actions dealing with portable device services; various prizes and lottery participations). At the same time, the confirmation message can be used for taking all necessary actions in case of non-genuine sold products.

In the general case, the authentication procedure can be considered according to the protocol presented in FIG. 4 where both restricted shopping area verification based on the open part of the PIN (2*a*) and public verification based on the hidden part of the PIN (2*b*) are performed. Depending on this two-stage verification results, the product authenticity is confirmed or rejected as well as the databases (5*a*) and (5*b*) are modified accordingly. In particular, the first authentication verification stage is performed inside the restricted area and the database of user requests (5*b*) is updated, i.e., a new field containing the portable device identification number is created. The corresponding update is performed in the database of open secure PINs (5*a*) linking the corresponding product with the portable device identification information. In case the product is passing the second secure authentication stage performed outside the shopping area based on the hidden encoded/encrypted part of the authentication information (2*b*), the final decision is delivered to the consumer via the portable device (3). The decision generated by the authentication server besides the final confirmation or rejection of the product authenticity contains the update of the consumer account information stored in the database of user requests. According to the first part of the generated information, the product will be further considered as a sold out or not authentic, which will lead to the corresponding modification of the databases. In order to finally confirm the authenticity of the purchased item, the following requirements should be satisfied. First, the hidden part of the secure code located on the product, packaging or label in digital or analogue form, should coincide with the information stored in the database of hidden codes. Moreover, the pair of open/hidden secure codes retrieved from the product should have a correspondence to a linked field pair stored in the databases of open and hidden PINs. Second, both requests received during inside/outside shopping area verifications, should be delivered from a unique portable device. In the case when both requirements are satisfied, the authentication server generates the corresponding reply to be delivered to the consumer in a visual or analogue form that besides the authenticity confirmation contains the status of the user account (a number of successfully performed purchases with the confirmed authenticity, etc.). This information can be used as a basis for various encouraging actions when consumer will benefit from or will participate to various bonuses programs provided by a mobile communications operator, lotteries, prizes etc. At the same time, this information can be used for product tracing and market analysis. The corresponding database update is performed accordingly, i.e., the fields, corresponding to the open and the hidden parts of the secure codes of a certified authentic product are marked as "checked out" and will no longer be considered as valid codes for any future verification. In case when the hidden part of the PIN is not found among the valid secure PINS stored in the database of the hidden PINs or the open/hidden PINs pair does not have a unique match with the corresponding fields in the databases, the authenticity is rejected. In case, the requests that correspond to different open product PINS are sent from the same portable device multiple times or the information generated during inside and outside verification stages were received from two different portable devices, the consumer is informed about the mismatch and warned about potential consequences that might vary from preventing access attempts to the authentication verification services performed from the corresponding portable device to a legal issues initiated accordingly to the local law basis regulating mobile communications and illegal activity in mobile networks.

Pin Enrollment, Acquisition and Verification

Depending on the authentication information storage and acquisition, there exist several possible scenarios of PIN data enrollment proposed in the present authentication protocol. We consider a common protocol for both open and hidden parts of the PIN. We assume that the PIN can be communicated either directly from the product to the acquisition device. The possible ways of communication include but are not limited to: communication in the form that can be perceived using visual or audio modalities or using special inks or frequencies, and indirect secure part that is communicated via special steganographic protocol using tools of digital watermarking that can include images (natural, synthetic, bar codes, etc.), text or audio signals. For example according to FIG. 5, the direct part can be either reproduced on a product surface, package, and label or on a specific attached device depending on the exploited storage principle ($y_P$), or, it can be audio reproducible ($y_A$) by the device (11). One option consists in storing the PIN in the printed or engraved forms (8). In order to enhance the security of the authentication protocol as well as to establish the product tracking and to be informed about the fact of product consumption or integrity damage, it is supposed that the hidden part of the authentication information might be encoded, encrypted as well as covered by a layer or cover to be removed or destroyed to reveal the hidden information or printed on the back side of an adhesive label. Moreover, to avoid unauthorized product or packaging re-use it is also possible to cover the hidden PIN by a removable layer and to print the open part of the PIN on top on it. By disclosing the hidden part of the PIN the open part is automatically destroyed. The encoding and encryption steps exploit common or distinct secret keys.

In the second foreseen way of authentication information enrollment, the audio channel is exploited. In this case, the information is used to modulate an audio signal produced using spelling based on the visual data $y_P$, mechanical, vibro, piezoelectric or any other appropriate principles of sound generation mentioned in the previous part of the invention. The PIN is stored on a storage and reproduction device attached to the product or its package. Modulation might be performed in an insecure way as well as using corresponding encryption and encoding based on the random coding principle [13].

At the outside restricted shopping area verification stage the stored information is directly acquired from the product, package, label, etc. by removing a protection cover or layer, opening a product package, de-attaching a removable part of a product label, or reproducing a sound and is acquired by existing acquisition/input means integrated into a consumer portable device (like digital camera, keyboard, microphone or any other available means).

The acquired information in the form of a typed text, digital photo in one of available graphic formats or audio sequence is used to generate a request transferred to the authentication server.

The information describing the user request is processed on the secure authentication server depending on a particular channel used for its transmission (visual, audio or steganographic) and the encryption/encoding involved in the protocol.

In case when the optical channel is exploited for the information acquisition, direct decoding (17) of data from the barcodes with any modulation $\hat{c}$ is performed. In case of symbolic data representation, OCR (13) is used in order to extract un-encoded or encoded/encrypted PIN from its analogue form $\hat{c}'$. When a manual input is exploited, the typed coded data $\hat{c}''$ are directly sent to the decoder. In case the encryption/decryption is organized in an asymmetric manner, a pair of a private/public keys are exploited to encrypt and decrypt authentication information, accordingly.

In case, when the audio channel is exploited to communicate the PIN, the processing main steps vary depending on which authentication information transmission channel was used or the enrollment stage. When the information is transferred via an optical channel but communicated to the authentication server via audio channel by its spelling it is processed by a speech recognizer resulting in $\hat{c}'''$ and either directly passes to the verification stage or goes through the key-dependent decryption and decoding if necessary.

When the authentication information is modulated as the audio signal at the enrollment stage, the processing might involve a demodulation stage if necessary.

Being decoded as the estimate of PIN $\hat{m}$, the authentication information is passed to the verification stage where it is compared to the content of the database (5) after corresponding processing. Depending on the result of the verification stage (18), the corresponding authenticity confirmation/rejection message containing customer account information is generated (19) as well as the database update is performed accordingly. This stage output is then transferred to the message activation (20) stage where it is finally communicated to the customer via display (21), vibro (22) or audio (23) signal or any other available information transmission form that might be perceived by a consumer.

Authentication Based on the Printed Data

Figure 5:
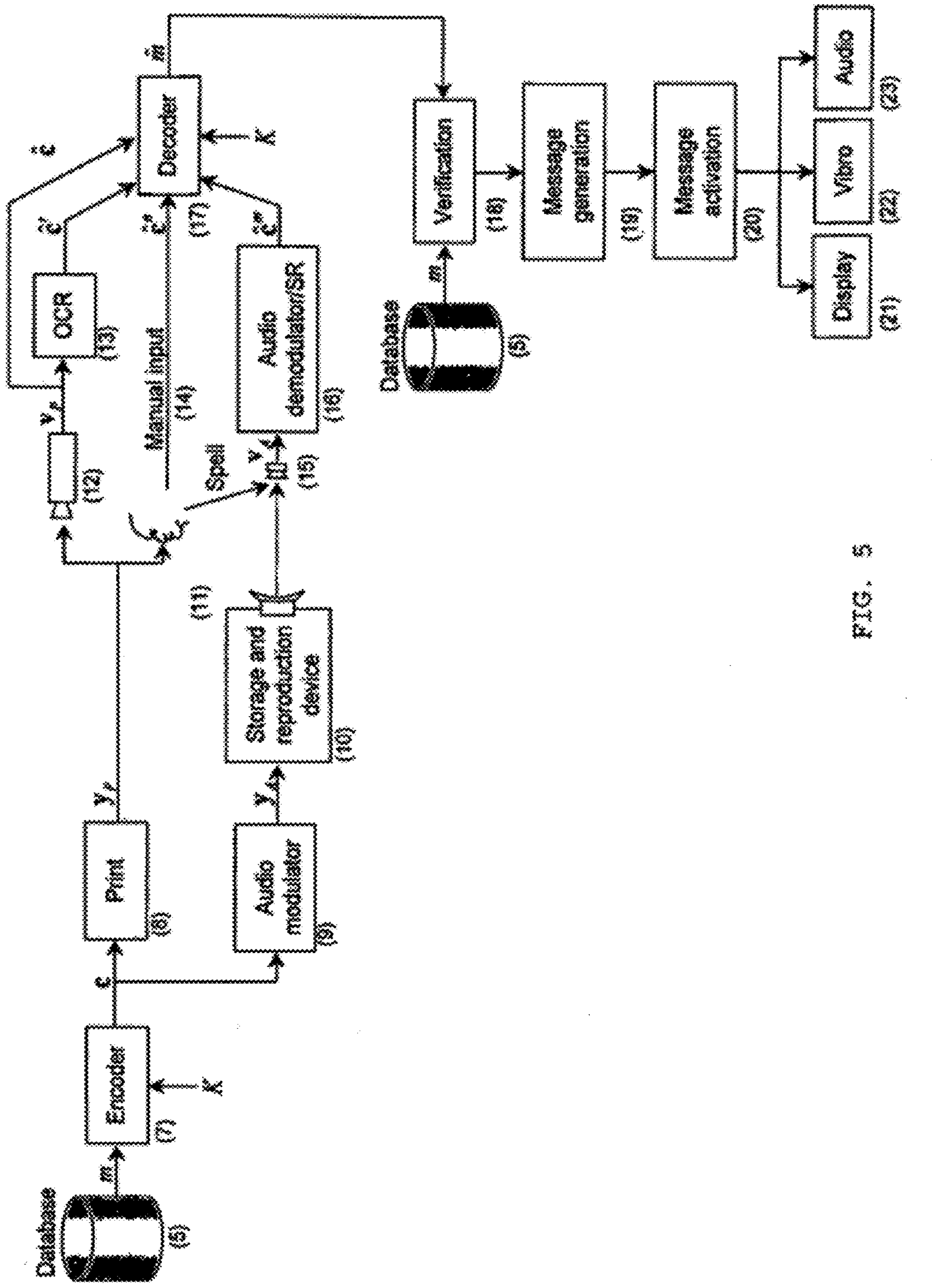
FIG. 5: Example of authentication information enrollment and inside/outside restricted shopping area verification stage. A PIN m is extracted from the database (5). Based on the secret key K, it is transformed to the encoded stream c at the encoder (7) using turbo, low-density parity check, Reed-Solomon, MLC or TCM or any other suitable available encoding technique and modulated in alphanumeric form, graphics, bar codes, consisting of dots, lines polygons, etc. or any other coded representation of encoded data. Depending on the particular version of protocol implementation two possible ways of the authentication information c enrollment are foreseen in this Example. In the first case, it is simply printed as $y_P$ using a printing device (8) or alternatively a laser engraving on the product surface/label/package in an open/secure way depending on the use for inside/outside restricted shopping area verification. On the inside/outside restricted shopping area verification stage the information $\hat{c}''$ is directly retrieved from a storage location/from a secure storage location by removing a secure ink layer, opening a product package; de-attaching a removable part of a product label and is acquired by existing acquisition/input means integrated into a consumer portable device (like digital camera (12), keyboard (14) or any other available). In case, the optical channel is exploited for the information acquisition, either data are retrieved directly as c from visually encoded patterns of dots, lines or polygons or from optical character recognition (OCR) (13) used to extract the encoded authentication information $\hat{c}'$ from its analogue form $v_P$. In the third possible way of authentication information acquisition used for outside restricted shopping area verification, the audio channel is used. In this case, this information is used to modulate an audio signal produced either by the consumer or by some means using spelling, vibro, piezoelectric or any other available principles of sound generation in audio modulator (9). The output $y_A$ is stored on a storage and reproduction device (10). At the verification stage, the corresponding audio signal is activated through a transducer, electromechanical or piezoelectric or magnetic buzzer, plasma tweeter or any other sound reproducing device available. This reproduced modulated audio signal is acquired by a microphone (15) of a consumer portable device and is passed to the audio demodulator/speech recognition (SR) (16) in order to extract the encoded authentication information $\hat{c}'''$. When the encoded authentication information ($\hat{c}$, $\hat{c}'$, $\hat{c}''$ or $\hat{c}'''$ depending on the particular exploited principle of this information enrollment) is acquired, the decoder (17) performs the extraction of authentication information $\hat{m}$ based on the key K according to the used encoding, i.e., turbo, low density parity check, Reed-Solomon or any other encoding principle used by the encoder (7). The extracted $\hat{m}$ is passed to the verification (18) where its content is verified with the corresponding data provided by the database (5). Depending on the result of the verification stage, the corresponding authenticity confirmation/rejection message containing consumer account information is generated (19) as well as the database update is performed accordingly. The generation output is then transferred to the message activation (20) stage where it is finally communicated to the consumer via display (21), vibro (22) or audio (23) signal or any other available interfaces.
Figure 6:
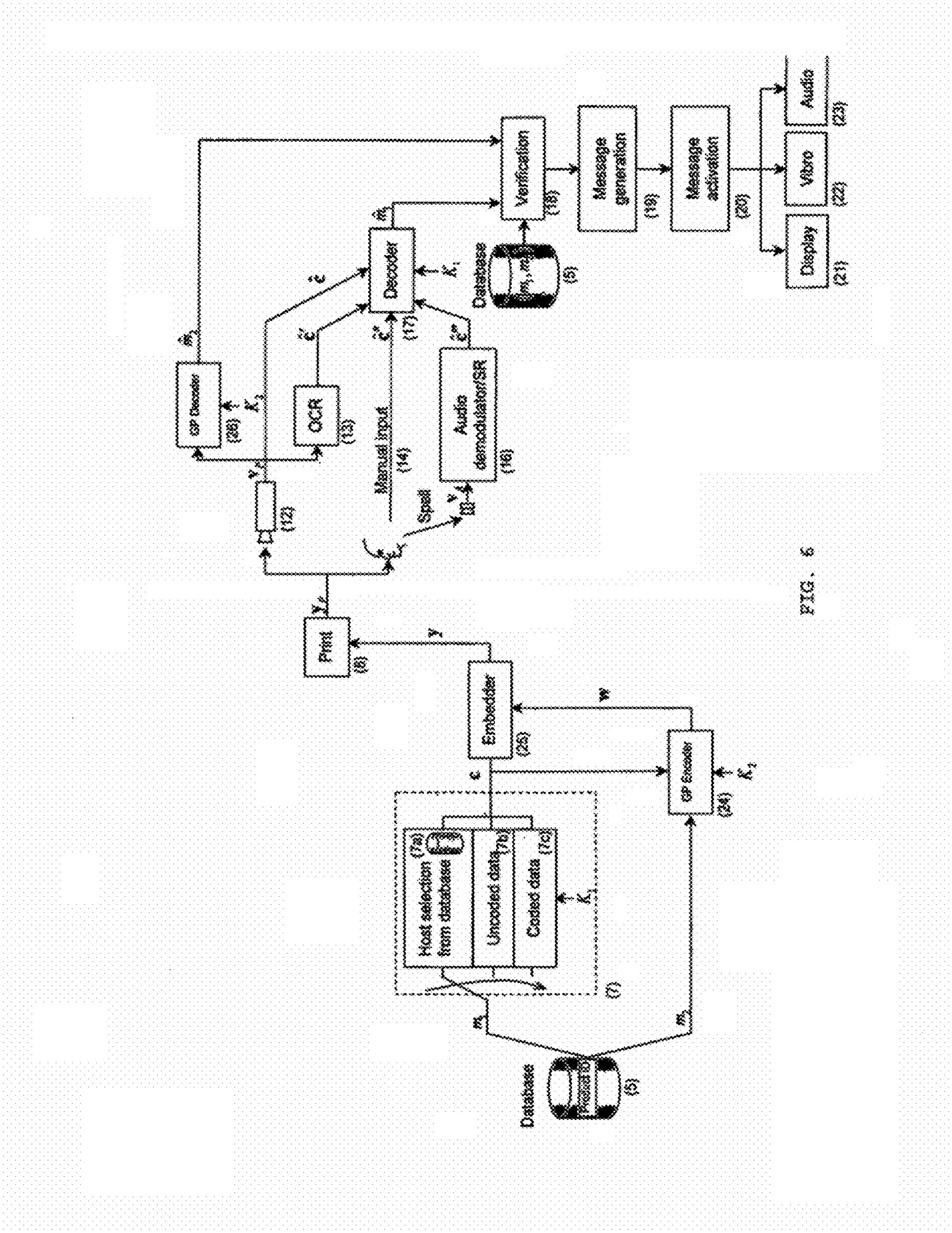
FIG. 6: Example of authentication information hybrid enrollment and inside/outside restricted shopping area verification stage. A PIN m is extracted from the database (5) and split into two parts $m_1$ and $m_2$ in order to enhance protocol security. The first part is encoded at the encoder (7) using turbo, low-density parity check, Reed-Solomon or any other suitable encoding principle based on the secret key $K_1$. The generated output c is used by the Gel'fand-Pinsker (GP) encoder (24) [12] with input $m_2$ based on key $K_2$ to produce a rate-optimized encoded stream w that is converted to the stego authentication data y at the embedder (25) and printed/engraved by the printer (9) on the product surface/package or adhesive label ($y_P$). At the extraction stage, depending on the particular protocol implementation, several possibilities exist for the stored information $y_P$ acquisition. Among the existing alternatives, a consumer by means of digital camera (12) of the available portable device converts this information from analogue to digital form $v_P$. At the decoder (26) the second part of the message $\hat{m}_2$ is extracted based on the secret key $K_2$ using Gel'fand-Pinsker decoder. Simultaneously, $v_P$ is passed either directly to the decoding (17) as c or to the OCR (13) to convert the analogue authentication information into the digital form $\hat{c}'$. Alternatively, this operation ($\hat{c}''$ extraction) can be performed by a manual input or by spelling via an audio channel (audio demodulator/SR (16), extraction of $\hat{c}'''$). The result of this stage ($\hat{c}$, $\hat{c}'$, $\hat{c}''$ or $\hat{c}'''$) is passed to the decoder (17), where $\hat{m}_1$ is decoded based on the secret key $K_1$. The result of the decoding stage ($\hat{m}_1$ and $\hat{m}_2$), similarly to the setup considered in FIG. 5, is compared to the data provided by the database (5) at the verification stage (18). Depending on the result of the verification stage, the corresponding authenticity confirmation/rejection message containing consumer account information is generated (19) as well as the database update is performed accordingly. The generation output is then transferred to the message activation (20) stage where it is finally communicated to the customer via display (21), vibro (22) or audio (23) signal or any other available information transmission form that might be perceived by a customer.

The authentication protocol based on printed data can be constructed based on either direct or steganographic channels. The basic direct communication protocol was already discussed in FIG. 5. The extension of this protocol can include the generation of random or encoded text data or various visual symbologies represented by c. To enhance the security of the protocol, the data c is considered as the cover data that is combined with some hidden part encoded and represented by the watermark (FIG. 6).

The encoding is based on a secret PIN m extracted from the database (5). To provide an additional level of freedom that will increase the security of the proposed protocol the PIN m is split into two parts $m_1$ and $m_2$. The first part $m_1$ jointly with the key $K_1$ produce the codeword c in (7) using either host selection from the database (7_a_), or by generation of a random codeword where the pair $m_1$ and $K_1$ are used as a seed for the random generator (7_b_), or encryption, encoding and modulation of $m_1$ (7_c_). In the case of (7_c_), $m_1$ is encoded using turbo, low-density parity check, Reed-Solomon or any other suitable encoding principle based on the secret key $K_1$. In all cases, the resulted data c can be represented in the form of text structures, dots, lines, any symbologies, etc., vector graphics components (1D, 2D or 3D objects).

The generated output c is passed to a Gel'fand-Pinsker (GP) encoder (24) with input $m_2$ based on key $K_2$ to produce the watermark w that is converted to the stego data y at the embedder (25) and printed/engraved by the printer (9) in the form $y_P$ on the product surface, packaging, adhesive label or any document certifying the product origin.

At the extraction stage, depending on the particular protocol implementation, several possibilities exist for the stored information $y_P$ acquisition. The product authenticity verification can be performed solely based on the direct part of $y_P$ without taking into account watermark data similarly to FIG. 5. In the case when the steganographic channel is additionally involved into the authentication procedure, the decoder (26) extracts the message $\hat{m}_2$ based on the scanned data $v_P$ and the secret key $K_2$ using Gel'fand-Pinsker decoder. Simultaneously, $v_P$ is passed either directly to the decoding (17) as $\hat{c}$ or to the OCR (13) to convert the analogue authentication information into the digital form $\hat{c}'$. Alternatively, this operation ($\hat{c}''$ extraction) can be performed by a manual input or by spelling via an audio channel (audio demodulator/SR (16), extraction of $\hat{c}'''$). The result of this stage ($\hat{c}$, $\hat{c}'$, $\hat{c}''$ or $\hat{c}'''$) is passed to the decoder (17), where $\hat{m}_1$ is decoded based on the secret key $K_1$. The result of the decoding stage ($\hat{m}_1$, and $\hat{m}_2$), similarly to the setup considered in FIG. 5, is compared to the data provided by the database (5) at the verification stage (18). Depending on the result of the verification stage, the corresponding authenticity confirmation/rejection message containing consumer account information is generated (19) as well as the database update is performed accordingly. The output is then transferred to the message activation (20) stage where it is finally communicated to the customer via display (21), vibro (22) or audio (23) signal or any other available information transmission form that might be perceived by a customer.

Authentication Based on the Audio Data

Figure 7:
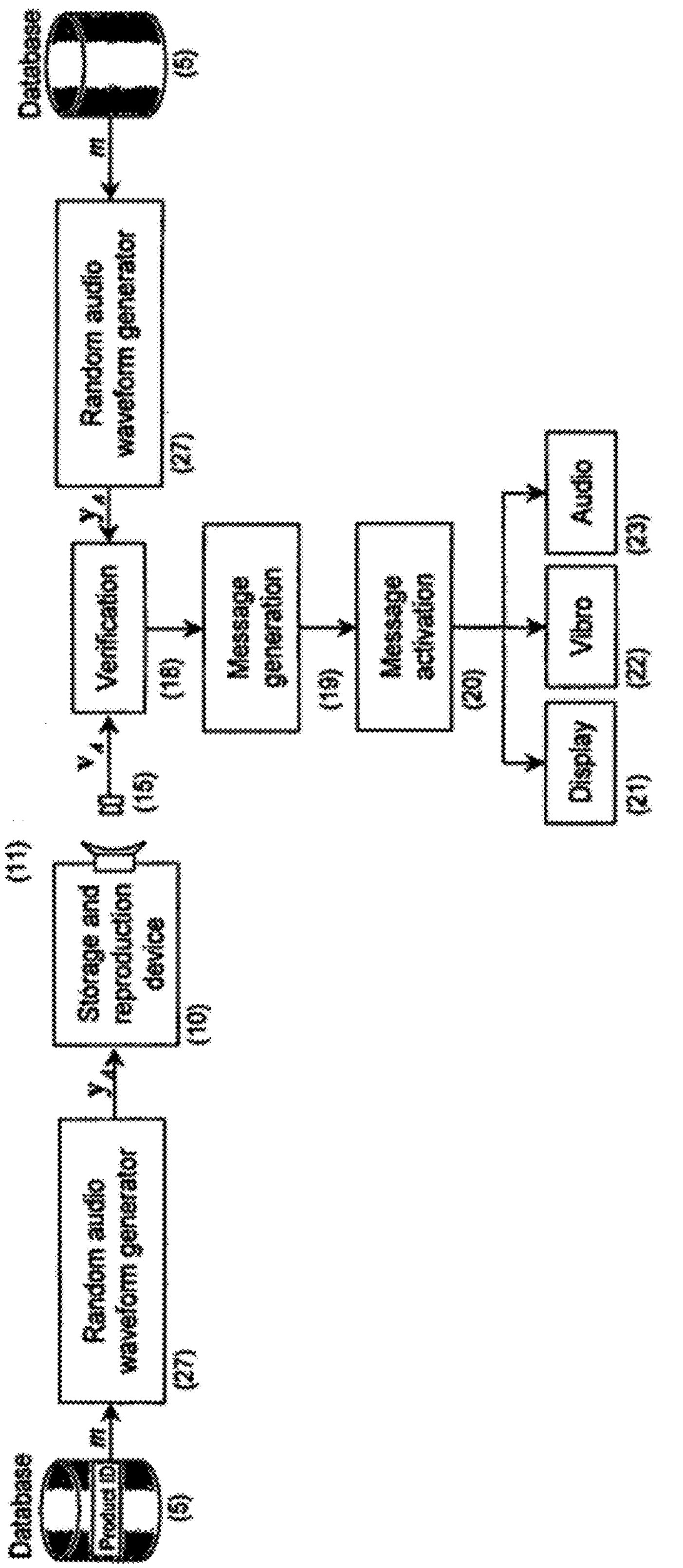
FIG. 7: Example of authentication information hybrid enrollment via audio channel and outside shopping area verification stage. A PIN m is extracted from the database (5) and is passed to the random audio waveform generator (27) as a seed. The generated random audio wave $y_A$ is stored on the storage and reproduction device (10). At the extraction stage, depending on the particular audio reproduction device used (i.e., transducer, electromechanical or piezoelectric or magnetic buzzer, plasma tweeter or any other suitable means), the corresponding physical principle is exploited to reproduce this wave via the loudspeaker (11). The reproduced wave is acquired by a microphone (15) of a consumer portable device ($v_A$) and is passed to the verification stage (18) where it is compared to the waveforms generated by the random audio waveform generator (27) based on the product m, considered to be a seed that is received from the database (5). Depending on the result of the verification stage, the corresponding authenticity confirmation/rejection message containing customer account information is generated (19) similarly to the protocols presented in FIG. 5 and FIG. 6 as well as the database update is performed accordingly. The generated output is then transferred to the message activation (20) stage where it is finally communicated to the customer via display (21), vibro (22) or audio (23) signal or any other available information transmission form that might be perceived by a consumer.
Figure 8:
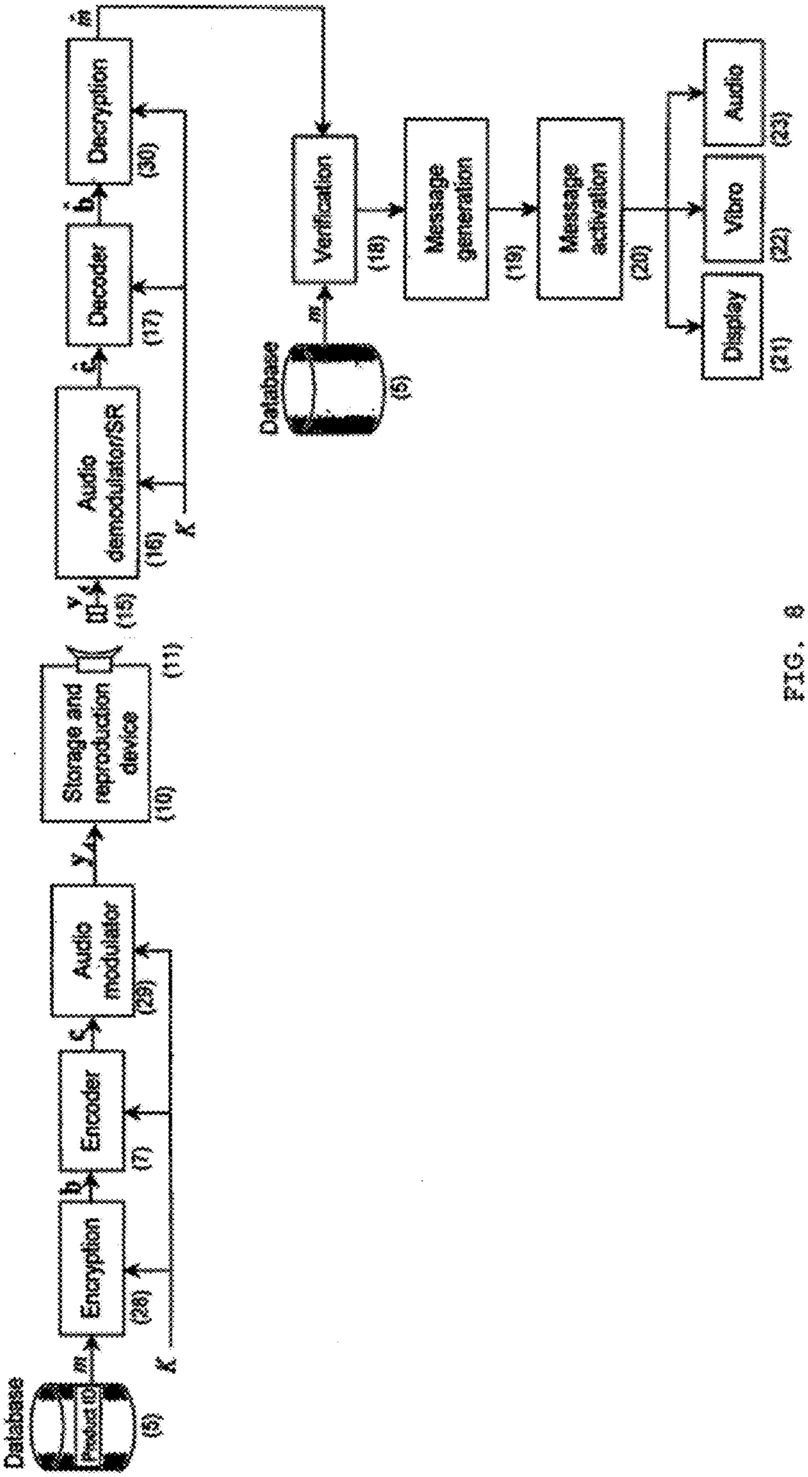
FIG. 8: Example of encrypted authentication information enrollment via audio channel and outside restricted shopping area verification stage. A PIN m is extracted from the database (5) and is passed to the encryption (28) where the secure encrypted bit stream b is produced based on the secret key K. In order to enable reliable communications of b, it is converted to a codeword c at the K-dependent encoder (7) using turbo, low-density parity check, Reed-Solomon or any other suitable for this purpose encoding techniques. Finally, an audio signal $y_A$ is encoded, recorded and saved in a way suitable for audio reproduction using the storage and reproduction device (10) that is attached to the product surface, its package or adhesive label. The device (10) includes transducer, electromechanical or piezoelectric or magnetic buzzer, plasma tweeter or any other means available. At the extraction stage, depending on the particular audio reproduction device used (i.e., transducer, electromechanical or piezoelectric or magnetic buzzer, plasma tweeter or any other techniques or devices), the corresponding physical principle is exploited to reproduce this wave via the loudspeaker (11). The reproduced wave is acquired by a microphone (15) of consumer portable device ($v_A$) and is passed to the audio demodulator/SR (16) were the stream C is extracted. On the next stage, c enters the decoder (17) that produces the estimate of the encrypted authentication information b converted at the decryption stage (30) to the raw format $\hat{m}$. It is important to note that the same secret key K used at the enrollment phase is exploited by (16), (17) and (30). The output of decryption $\hat{m}$ is passed to the verification stage (18) where it is compared to the data m provided by the database (5). Depending on the result of the verification stage, the corresponding authenticity confirmation/rejection message containing consumer account information is generated (19) similarly to the protocols presented in FIG. 5, FIG. 6 and FIG. 7 as well as the database update is performed accordingly. The generated output is then transferred to the message activation (20) stage where it is finally communicated to the customer via display (21), vibro (22) or audio (23) signal or any other available information transmission form that might be perceived by a consumer.

The authentication protocol based on the audio data is similar to one based on the printed data and can be constructed based on either direct or steganographic channels. The basic direct authentication protocol can be organized based on the random waveforms (FIG. 7) or coded waveforms (FIG. 8). In both cases, a PIN m is extracted from the database (5).

According to the random waveforms approach (FIG. 7), m is used as a seed for the random audio waveform generator (27) with the output $y_A$ that is stored on the storage and reproduction device (10). At the extraction stage, the stored signal is reproduced via the loudspeaker (11) from which the reproduced wave is acquired by a microphone (15) of a consumer portable device ($v_A$) and is passed to the verification stage (18) where it is compared to the waveforms generated by the random audio waveform generator (27) based on the product m, considered to be a seed that is received from the database (5).

According to the coded waveforms approach (FIG. 8), a PIN m is extracted from the database (5) and is passed to the encryption (28) where the secure encrypted bit stream b is produced based on the secret key K. In order to enable reliable communications of b, it is converted to a codeword c at the K-dependent encoder (7) using turbo, low-density parity check, Reed-Solomon or any other suitable for this purpose encoding techniques. Finally, an audio signal $y_A$ is encoded, recorded and saved in a way suitable for audio reproduction using storage and reproduction device (10) that is attached to the product surface, its package or adhesive label. The authentication is performed in the reverse order.

Figure 9:
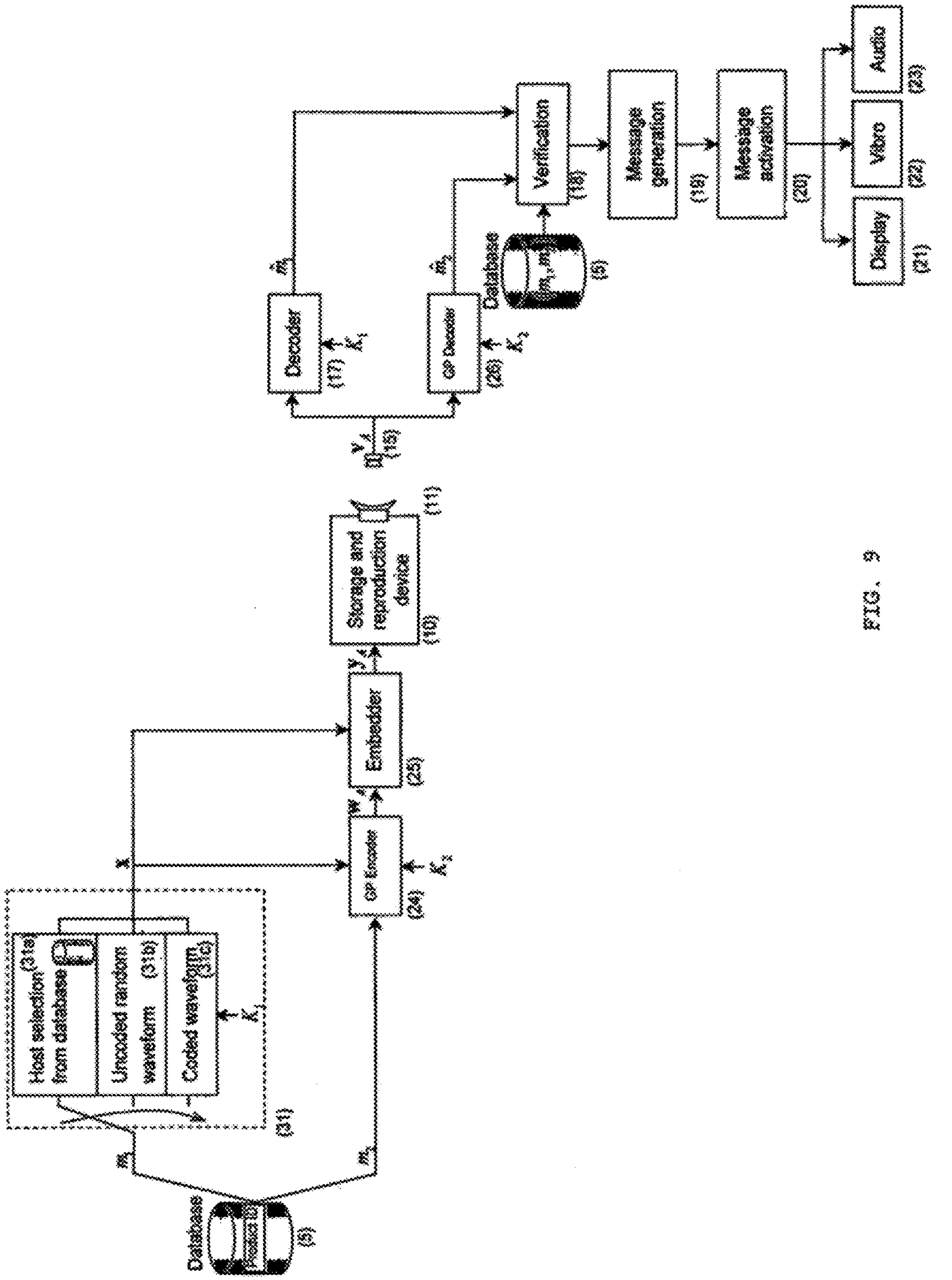
FIG. 9: Example of generalized authentication information enrollment with hybrid hidden-data storage via audio channel for outside restricted shopping area verification stage. A PIN is extracted from the database (5) and split into two parts $m_1$ and $m_2$ that are communicated to the encoding stage. On this stage $m_1$ is represented by a host signal X (31) that depending on the particular protocol implementation might be a signal selected from a database (31*a*), uncoded (31*b*) or coded (31*c*) random waveforms, etc. The selection is performed using a secret key $K_1$. The second part of the authentication information $m_2$ is encoded by the GP encoder given the realization of x and the secret key $K_2$ to obtain a sequence $w_A$ that is combined at the embedder (25) with x to produce the final representation of the authentication information $y_A$. The resulting $y_A$ is stored in the storage (10) and reproduction (11) devices attached to the product surface, its package or adhesive label, i.e., transducer, electromechanical or piezoelectric or magnetic buzzer, plasma tweeter or any other mean available. At the extraction stage, depending on the particular audio reproduction device used (i.e., transducer, electromechanical or piezoelectric or magnetic buzzer, plasma tweeter or any other mean available), the corresponding physical principle is used to reproduce this wave via the loudspeaker (11). The reproduced wave $v_A$ is acquired by a microphone (15) of a consumer portable device and is passed to the decoder (17) that retrieves $\hat{m}_1$ based on $K_1$ while the GP decoder (26) decodes $\hat{m}_2$ using the secret key $K_2$. The output of decoding $\hat{m}_1$ and $\hat{m}_2$ is passed to the verification stage (18) where it is compared with the data ($m_1$, $m_2$) provided by the database (5). Depending on the result of the verification stage, the corresponding authenticity confirmation/rejection message containing customer account information is generated (19) similarly to the protocols presented in FIG. 5, FIG. 6, FIG. 7 and FIG. 8 as well as the database update is performed accordingly. The generated output is then transferred to the message activation (20) stage where it is finally communicated to the customer via display (21), vibro (22) or audio (23) signal or any other available information transmission form that might be perceived by a consumer.

In the case when the steganographic channel is used for the secure authentication, the protocol is constructed similarly to those used for printed data (FIG. 6) and is shown in FIG. 9. The only difference consists in the fact that the audio signals and corresponding modulation, reproduction and demodulation means are used as opposed to the printing/engraving and scanning.

Practical Aspects of Robust Data Encoding and Verification

In the case of both printed and audio data based authentication there is a need to provide reliable decoding and verification of the product data. The problems of product authentication based on printed data using text, images or any graphical symbologies are caused by the printing/scanning, defocusing (blurring), resolution constraints of portable device imaging camera, geometrical distortions, nonlinear contrast transformation as well as restrictions of messaging protocol that might cause additional resizing and/or compression. Similar corresponding distortions can occur for the audio-based authentication. Therefore, proper techniques should be applied to enable errorless communication of PIN to the verification module (18).

We propose three main practical approaches to overcome the above problems based on:

Correcting errors that might occur at the acquisition stage by introducing proper redundancy using coding and synchronization;

Taking into account the above hypothetical distortions in the design of proper representation of encoded features/hashes in the database of PINS;

Designing robust verification procedures invariant to the defined types of distortions.

Figure 10:
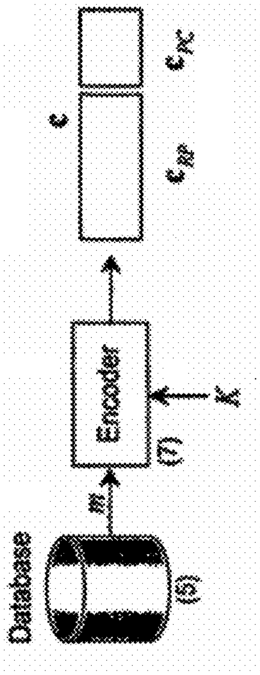
FIG. 10: Example of encoding the PIN index m into the codeword c for reliable communication via printed and audio channels. The encoder maps m and key K into c, which consists of two parts, i.e., regular part $c_{RP}$ and parity check $c_{PC}$ part. The main purpose of such kind of encoding consists in the possibility to use the regular part $c_{RP}$ for direct reading by humans. The parity check part $c_{PC}$ can be read both by humans or by machines. Moreover, the parity check part can also be communicated via some auxiliary channel. Therefore, these two parts can be either concatenated (or interleaved) and communicated via the same channel or separated and communicated via different channels.

The first approach attempts to design reliable coding strategies capable to provide errorless decoding of the PIN index m after data acquisition in portable device and its communication to the verification stage. We will exemplify this approach based on the text data assuming that without loss of generality the same strategy can be extended to images, symbologies and audio. For the high flexibility of the PIN communication protocol, we assume that the data can be entered either manually by the human being, who is in some sense the best OCR, or acquired automatically by the camera. For this reason, the proposed construction of robust coding includes such an encoder (7) (FIG. 10), which maps the PIN m and key K into the codeword c, which consists of two parts, i.e., regular part $c_{RP}$ and parity check $c_{PC}$ part. The regular part $c_{RP}$ is dedicated to the direct human acquisition while the parity check part $c_{PC}$ can be entered either by the human (FIG. 11) or communicated via some auxiliary channel (FIG. 12). This example is rather demonstrative since in principle both parts $c_{RP}$ and $c_{PC}$ can also be automatically acquired by the imaging device.

Figure 11:
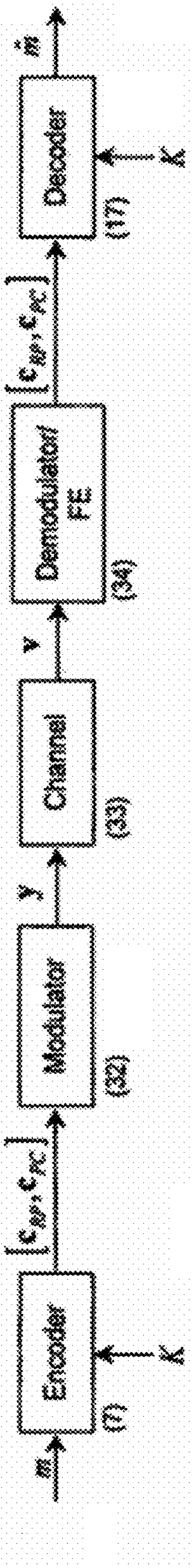
FIG. 11: Example of FIG. 10 where the regular part and the parity check part are communicated via the same channel that might include printing, scanning, blurring, rotation, resizing or more generally affine or projective transformations and compression for the printed data and corresponding distortions that might occur during reproduction and acquisition of audio data. The output of the decoder (7) is concatenated (potentially with interleaving) into the vector [$c_{RP}$, $c_{PC}$]. The modulator (32) produces the vector y that can be either some meaningful alphanumeric data or coded symbologies or graphics. The vector y is communicated via some channel (33) that results into the distorted version v. The demodulator or feature extraction (FE) (34) produces the estimate of the vector [$\hat{c}_{RP}$, $\hat{c}_{PC}$], which can be considered as the operation inverse to the modulation, and the decoder (17) generates the estimation of the PIN $\hat{m}$ assuming the availability of the key.
Figure 12:
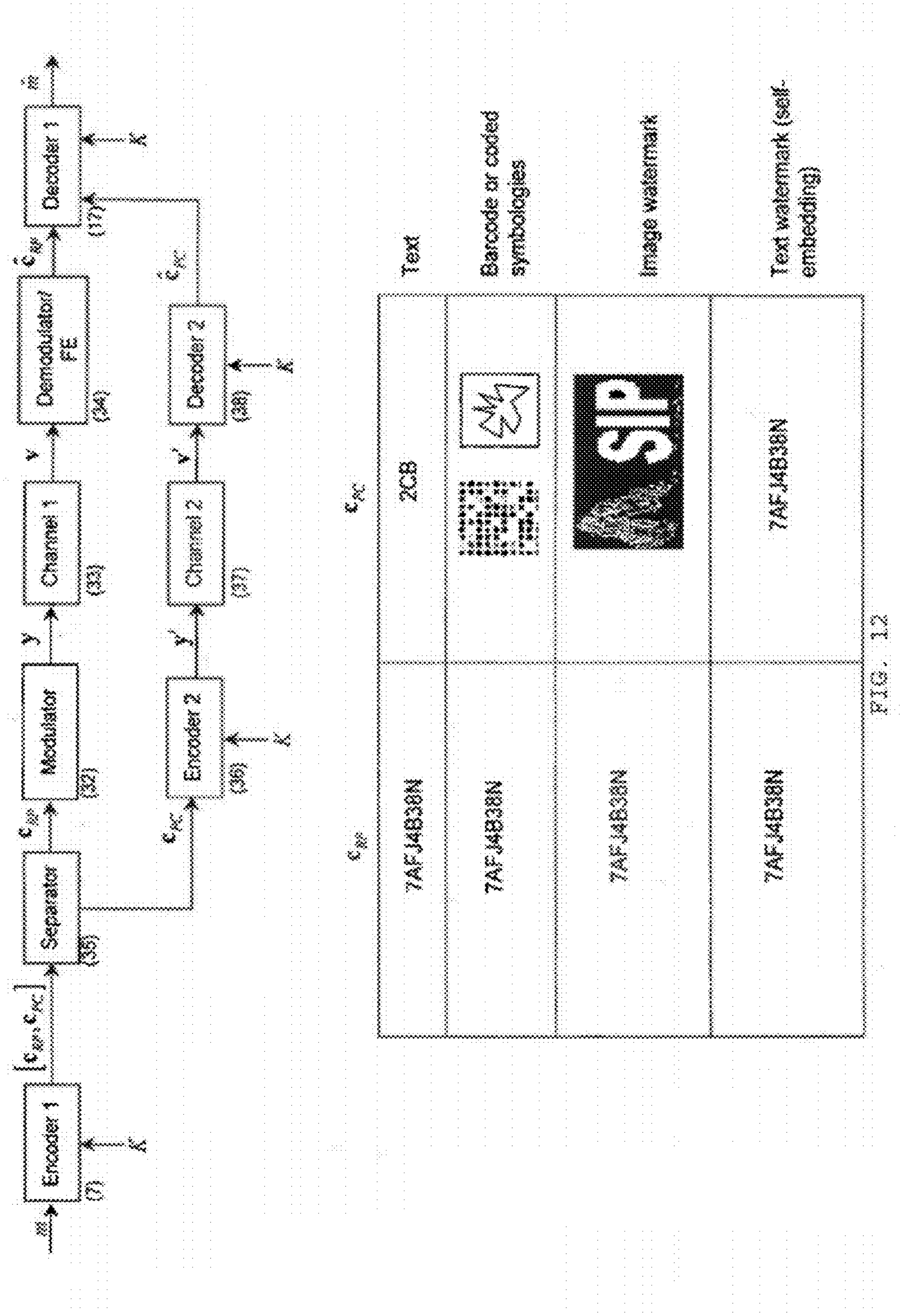
FIG. 12: Example of FIG. 10 where the regular part and the parity check part are communicated via different channels. Similarly to the previous figures, the encoder (7) generates a vector [$c_{RP}$, $c_{PC}$] based on the PIN index m and key K. However, in this protocol the regular part $c_{RP}$ and parity check $c_{PC}$ part are separated in block (35). The regular $c_{RP}$ part of the code is communicated via the habitual channel (33). To perform this communication, the modulator produces the vector y and the demodulator/feature extractor block (34) generates the estimate $\hat{c}_{RP}$ based on the channel output v. The $c_{PC}$ part assumes machine based decoding. Therefore, the channel 2 (37) can be represented by the barcode, or any coded symbologies, watermark that can be embedded into some extra image or directly into the $c_{RP}$ part. $c_{PC}$ part is encoded at the encoder 2 (36) and decoded at the decoder 2 (38) that corresponds to the above cases. This system design also resembles the unequally protection properties. Similar to error correction codes with unequal protection of information bits.

The protocol presented in FIG. 11 generalizes the communication setups when both parts are communicated via the same channel that might include printing, scanning, blurring, rotation resizing or more generally affine or projective transformations and compression for the printed data and corresponding distortions that might occur during reproduction and acquisition of audio data. In this case, both parts [$c_{RP}$, $c_{PC}$] are modulated into data y that can be either some meaningful alphanumeric data or coded symbologies or graphics that is communicated via some channel (33) that results into the distorted version v. The demodulator or feature extraction (FE) (34) produces the estimate of the vector [$\hat{c}_{RP}$, $\hat{c}_{PC}$] and the decoder (17) generates the estimation of the PIN $\hat{m}$.

The PIN communication protocol presented in FIG. 12 is based on the redundant data encoding similar to FIG. 11 with the only difference that the $c_{PC}$ part of the code is communicated via some auxiliary channel (channel 2 (37)). This provides additional flexibility since the $c_{RP}$ part is human readable and can be manually or orally spelled while the $c_{PC}$ part assumes machine based decoding. The channel 2 (37) can be represented by the barcode, or any coded symbologies, watermark that can be embedded into some extra image or directly into the $c_{RP}$ part. $c_{PC}$ part is encoded at the encoder 2 (36) and decoded at the decoder 2 (38) that correspond to the above cases.

Figure 13:
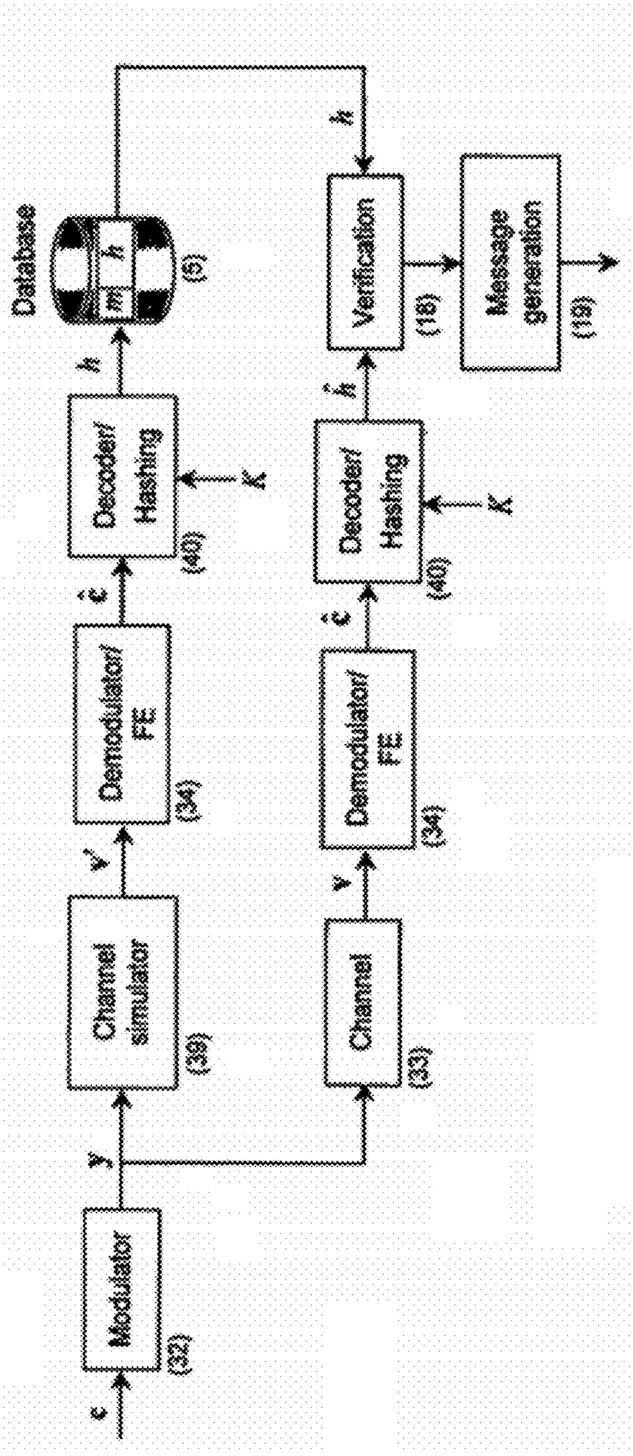
FIG. 13: Example of system design that takes into account the hypothetical channel distortions at the encoding stage to avoid any possible mismatch after decoding or hashing at the verification stage due to the channel degradations. The PIN m or the encoded PIN c is modulated at the modulator (32) to produce the output data y. The vector y is distorted into the virtual channel (39) that results in v' and the demodulator/feature extractor (34) produces an estimate $\hat{c}$. In such a way, the impact of channel degradations is predicted already at the encoding stage based on the available information about the actual channel behavior. The decoding or hashing is accomplished in the block (40) based on the key K that finally results in h. The decoding result or hash value h is stored in the database (5) under the index m. Another copy of y is communicated through the real channel (33) and decoded as $\hat{h}$ passing the demodulator (34) and decoding/hashing (40). The verification of $\hat{h}$ is performed in module (18) by comparing it with the counterpart h from (5).

The second approach attempts at predicting hypothetical channel distortions at the encoding stage to avoid a possible mismatch after decoding or hashing at the verification stage due to the channel degradations. Obviously, one can try to build the robust hash for this purpose. However, since the channel degradations are predictable at the encoder the benefit from this sort of side information can be significant, which simplifies the requirements regarding the robustness of the hash or error correction code. The block-diagram of this approach is shown in FIG. 13. The PIN m or the encoded PIN c is modulated at the modulator (32) to produce the output data y. A copy of these data goes through the channel simulator (39) that results in v' and the demodulator/feature extractor (34) produces an estimate $\hat{c}$. The hashing or decoding is accomplished in the block (40) based on the key K that finally results in h. It should be noticed that h should not necessarily coincide with m or c on the input of the system. h is considered as a hash and stored in the database (5) under the index m. At the same time the second copy of y is communicated through the real channel (33) and decoded as h passing the demodulator (34) and decoding/hashing (40). The verification of $\hat{h}$ is performed in module (18) by comparing it with the counterpart h from (5).

The third approach is based on the usage of robust verification procedures such as for example Levenshtein distance that measures the similarity between two vectors even with different lengths. The change of the hash length might result from the channel degradations and the failure of the demodulator, the feature extractor or the OCR modules.

REFERENCES

[1]. M. A. Amon, A. Bleikolm, O. Rozumek, E. Muller, O. Bremond, "Use of communication equipment and method for authenticating an item, unit and system for authenticating items, and authenticating device", US Patent number No 2003/0136837, filled Jun. 22, 2001 and published Jul. 24, 2003.

[2]. R. S. Miolla, M. R. Mehall, N. E. Lofgren, "Using digital watermarks to facilitate counterfeit inspection and inventory management", US Patent number No 2002/0146146, filled Aug. 7, 2001 and published Oct. 10, 2002.

[3]. G. B. Rhoads, T. F. Rodriguez, M. I. Livermore, "Methods for using wireless phones having optical capabilities", US Patent number No 2005/0213790, filled May 17, 2005 and published Sep. 29, 2005.

[4]. M. Kutter, S. Voloshynovskiy, A. Herrigel, "The Watermark Copy Attack". Proceedings of the SPIE, Security and Watermarking of Multimedia Contents II, Volume 3971, pages 371-379. San Jose, Calif., 2000.

[5]. L. Perez-Freire, F. Perez-Gonzalez, P. Comesania, "Secret dither estimation in lattice-quantization data hiding: a set-membership approach". In Edward J. Delp III and Ping W. Wong, editors, Security, Steganography, and Watermarking of Multimedia Contents VIII, San Jose, Calif., USA, January 2006.

[6]. P. Comesana, L. Perez-Freire, F. Perez-Gonzalez, "An information-theoretic framework for assessing security in practical watermarking and data hiding scenarios". In 6th International Workshop on Image Analysis for Multimedia Interactive Services, Montreux, Switzerland, April 2005.

[7]. P. Comesana, L. Perez-Freire, F. Perez-Gonzalez, "The blind Newton sensitivity attack". In Edward J. Delp III and Ping W. Wong, editors, Security, Steganography, and Watermarking of Multimedia Contents VIII, San Jose, Calif., USA, January 2006.

[8]. M. El Choubassi and P. Moulin, "A New Sensitivity Analysis Attack", In Edward J. Delp III and Ping W. Wong, editors, Security, Steganography, and Watermarking of Multimedia Contents VII, San Jose, Calif., USA, January 2005.

[9]. V. N. Bogdanov, D. V. Zheleznov, E. M. Kirillina, A. A. Savitskij, A. A. Subbotin, S. V. Teleljushkin, E. A. Fedkov, "Method for identification of authenticity of object", RU Patent number No RU 2132569, filled Nov. 11, 1998 and published Jun. 27, 1999.

[10]. E. V. Belov, "Procedure of identification of product", RU Patent number No RU 2181503, filled Jul. 30, 2001 and published Apr. 20, 2002.

[11]. T. Liebman, "Sound-generating containment structure", U.S. Pat. No. 5,130,696, filled Feb. 25, 1991 and published Jul. 14, 1992.

[12]. M. Gel'fand and M. S. Pinsker, "Coding for channel with random parameters", Problems of Control and Information Theory, vol. 9, no. 1, pp. 19-31, 1980.

[13]. T. Cover and J. Thomas "Elements of Information Theory", Wiley & Sons, NY, 1991.

The invention claimed is:

1. A method for the protection of products or the identification of their validity, expiration date or origin comprising the steps of:

(a) generating identification information m for a product to be protected, wherein generating said identification information m comprises generating visual representations in the form of visual data $y_P$;

(b) storing the generated identification information m in a product identification number (PIN) database;

(c) mapping the identification information m and a key K into a codeword c comprising a regular part $c_{RP}$ and a parity check part $c_{PC}$;

(d) communicating said regular part $c_{RP}$ and parity check part $c_{PC}$ via a common channel or separated channels to a modulator;

(e) modulating said regular part $c_{RP}$ and parity check part $c_{PC}$ to produce visual data $y_P$ reproduced on the product or on reproduction means attached to the product;

(f) reproducing the generated identification information m, including visual data $y_P$ on the product or on said attached reproduction means, said generated identification information reproduced on the product or on said reproduction means comprising an open part and a hidden part;

(g) acquiring, at any time when authenticity of said products is to be verified by a consumer, the identification information $\hat{m}$ from the product or from said reproduction means using a portable device;

(h) communicating the acquired identification information $\hat{m}$ over a communications channel to an entity having access to said PIN database, by formulating a request for authentication;

(i) verifying the acquired identification information $\hat{m}$ by comparison to the generated identification information m stored in the PIN database and generating a message certifying their match or mismatch;

(k) updating the PIN database with the result of the authentication verification; and (l) informing a consumer of the result, and wherein said visual data $y_P$ comprises an open part and a hidden part that are used for product authentication, the product authentication comprising the steps of— i) acquiring the open part of said visual data $y_P$ by a portable device and obtaining the result of the authentication verification based on the verification procedure of steps g to i;

ii) registering the request in a database of requests forming part of said PIN database and confirming or rejecting the product authenticity within a restricted shopping or authentication area;

iii) in the case of a predefined number of negative attempts of authenticity verification from a same identified portable device, informing the consumer about the repetitive failures to authenticate the product and asking the consumer to avoid buying, opening and/or consuming the good, product or brand from a given place or series while denying all further authentication services for a defined period of time to protect the authentication server against exhaustive search, guessing or overload attacks;

iv) in the case of positive confirmation, informing the consumer of a possibility of proceeding with buying, opening and/or consuming an authentic product, while the final authentication is to be performed based on the hidden part of said visual data $y_P$ using acquisition by the portable device and the verification procedure of steps g to i;

v) confirming or rejecting product authenticity based on the verification of the decoded hidden part of said visual data $y_P$ by comparing it with said data stored in the PIN database and registering the request for authentication in the request database;

vi) communicating the authentication results to the requesting portable device using any available communication means;

vii marking a PIN that passed successful authentication after above steps iv) and v) as a bought one and updating the PIN database accordingly.

2. The method of claim 1, wherein acquiring the identification information comprises automatically acquiring the identification information using an acquisition device being part of said portable device.

3. The method of claim 1, wherein acquiring the identification information comprises applying direct manual acquisition of the information using input means.

4. The method of claim 1, wherein said entity having access to said PIN database to which the acquired identification information is communicated comprises computing means, or a human.

5. The method of claim 1, wherein informing a consumer of the result is selected from the group consisting of displaying the result, vibrating to indicate the result, or generating audio signals to indicate the result.

6. The method of claim 1, wherein step (i), verifying and generating is performed by the portable device.

7. The method of claim 1, wherein step (i), verifying and generating is performed by an authentication server communicatively coupled to the portable device.

8. The method of claim 1, wherein step (g), acquiring, at any time when authenticity of said products is to be verified by a consumer, identification information $\hat{m}$ from the product or from said reproduction means comprises the consumer entering visual data $y_P$ into the portable device using a keyboard.

9. The method of claim 1, wherein the visual data $y_P$ is selected from the group consisting of alphanumeric characters, graphics, and bar codes.

10. The method of claim 1, wherein the identification information m is reproduced on a surface of the product and/or on said attached reproduction means which may consist in a packaging of the product, a label of the product, or a certificate accompanying the product, a document, a mark or a label establishing product origin, or any combination thereof.

11. The method of claim 1 wherein said hidden part of said visual data $y_P$ can be revealed by removing a protecting cover or layer, or by opening the packaging or product in such a way that the integrity of the hidden part is destroyed and unrecoverable.

12. The method of claim 1 wherein generating visual representations in the form of visual data $y_P$ comprises generating encoded and/or encrypted data y based on the identification information m and secret key K, then modulating the encoded and/or encrypted data to form visual data $y_P$.

13. The method of claim 12 wherein generating identification information further comprises generating a codeword c, and generating a watermark sequence w, the watermark sequence w being combined with the codeword c resulting in the visual data $y_P$.

14. The method of claim 13 wherein generating the codeword c comprises using encryption and/or encoding, and the secret key K, to generate the codeword c.

15. The method of claim 13, wherein generating the codeword c comprises using error correcting coding (ECC), wherein the ECC is selected from the group consisting of Bose-Chaudhuri-Hochquenghem (BCH) codes, Reed-Solomon (RS) codes, low density parity check (LDPC) codes, Turbo codes, multilevel-code (MLC), and trellis coded modulation (TCM).

16. The method of claim 13, wherein the codeword c is generated from a secret code $K_1$, whereas the watermark sequence w is combined with the codeword c resulting in the data $y_P$.

17. The method of claim 1, wherein the portable device is selected from a group of devices consisting of: a mobile phone, a personal digital assistant (PDA), a smartphone and a camera.

18. The method of claim 1, wherein generating identification information m for a product to be protected comprises generating information for a product m selected from the group of products consisting of:

(a) Anti-counterfeiting labels or packaging, boxes, shipping invoices, tax stamps, postage stamps and various printed documents associated with the product for authentication and certification of its origin;

(b) Medical prescriptions;

(c) Medicines and pharmaceutical products including but not limited to cough drops, prescription drugs, antibiotics;

(d) Adulterated food, beverages, alcohol as well as coffee and chocolate;

(e) Baby food and children toys;

(f) Clothing, footwear and sportswear;

(g) Health, skin care products, personal care and beauty aids items including perfume, cosmetics, shampoo, toothpaste;

(h) Household cleaning goods;

(i) Luxury goods including watches, clothing, footwear, jewelry, glasses, cigarettes and tobacco, products from leather including handbags, gloves;

(j) Car, helicopter and airplane parts and electronic chipsets for computers, phones and consumer electronics;

(k) Prepaid cards for communications or other services using similar protocol of credit recharging; and (l) Computer software, video and audio tapes, CDs, DVDs and other means of multimedia data storage with music, movies and video games.

19. A method for the protection of products or the identification of their validity, expiration date or origin comprising the steps of:

(a) generating identification information m for a product to be protected, wherein generating said identification information m comprises generating visual representations in the form of visual data $y_P$;

(b) storing the generated identification information m in a product identification number (PIN) database;

(c) mapping the identification information m and a key K into a codeword c comprising a regular part $c_{RP}$ and a parity check part $c_{PC}$;

(d) communicating said regular part $c_{RP}$ and parity check part $c_{PC}$ via a common channel or separated channels to a modulator;

(e) modulating said regular part $c_{RP}$ and parity check part $c_{PC}$ to produce visual data $y_P$ reproduced on the product or on reproduction means attached to the product;

(f) reproducing the generated identification information m, including visual data $y_P$ on the product or on said attached reproduction means, said generated identification information m reproduced on the product or on said reproduction means comprising an open part and a hidden part;

(g) acquiring, at any time when authenticity of said products is to be verified by a consumer, the identification information $\hat{m}$ from the product or from said reproduction means using a portable device;

(h) communicating the acquired identification information $\hat{m}$ over a communications channel to an entity having access to said PIN database, by formulating a request for authentication;

(i) verifying the acquired identification information $\hat{m}$ by comparison to the generated identification information m stored in the PIN database and generating a message certifying their match or mismatch;

(k) updating the PIN database with the result of the authentication verification; and (l) informing a consumer of the result and wherein said visual data $y_P$ can be reproduced only a predefined number of times using self-destroyable materials or materials that change or modify their properties under specified conditions to prevent product or packaging reuse or refilling and indicate the fact that a given product was bought or consumed.

20. A method for the protection of products or the identification of their validity, expiration date or origin comprising the steps of:

(a) generating identification information m for a product to be protected, wherein generating said identification information m comprises generating visual representations in the form of visual data $y_P$;

(b) storing the generated identification information m in a product identification number (PIN) database;

(c) mapping the identification information m and a key K into a codeword c comprising a regular part $c_{RP}$ and a parity check part $c_{PC}$;

(d) communicating said regular part $c_{RP}$ and parity check part $c_{PC}$ via a common channel or separated channels to a modulator;

(e) modulating said regular part $c_{RP}$ and parity check part $c_{PC}$ to produce visual data $y_P$ reproduced on the product or on reproduction means attached to the product;

(f) reproducing the generated identification information m, including visual data $y_P$ on the product or on said attached reproduction means, said generated identification information m reproduced on the product or on said reproduction means comprising an open port and a hidden port;

(g) acquiring, at any time when authenticity of said products is to be verified by a consumer, the identification information $\hat{m}$ from the product or from said reproduction means using a portable device;

(h) communicating the acquired identification information $\hat{m}$ over a communications channel to an entity having access to said PIN database, by formulating a request for authentication;

(i) verifying the acquired identification information $\hat{m}$ by comparison to the generated identification information m stored in the PIN database and generating a message certifying their match or mismatch;

(k) updating the PIN database with the result of the authentication verification; and (l) informing a consumer of the result, and wherein step v) performing said confirmation containing the product PIN, the time of requests for authentication and information about the requesting portable device comprises the step of encrypting and/or encoding said pieces of information into a visual signal using a secret key unknown to the consumer, sent to the consumer either after successful complete product authentication, or after a certain number of the above attempts or on the consumer demand and can be used as proof of product authenticity and/or of authentication requests of the bought product certified by the authentication services.

21. A method for the protection of products or the identification of their validity, expiration date or origin comprising the steps of:

(a) generating identification information m for a product to be protected, wherein generating said identification information m comprises generating visual representations in the form of visual data $y_P$;

(b) storing the generated identification information m in a product identification number (PIN) database;

(c) mapping the identification information m and a key K into a codeword c comprising a regular part $c_{RP}$ and a parity check part $c_{PC}$;

(d) communicating said regular part $c_{RP}$ and parity check part $c_{PC}$ via a common channel or separated channels to a modulator;

(e) modulating said regular part $c_{RP}$ and parity check part $c_{PC}$ to produce visual data $y_P$ reproduced on the product or on reproduction means attached to the product;

(f) reproducing the generated identification information m, including visual data $y_P$ on the product or on said attached reproduction means;

(g) acquiring, at any time when authenticity of said products is to be verified by a consumer, the identification information $\hat{m}$ from the product or from said reproduction means using a portable device;

(h) communicating the acquired identification information $\hat{m}$ over a communications channel to an entity having access to said PIN database, by formulating a request for authentication;

(i) verifying the acquired identification information $\hat{m}$ by comparison to the generated identification information m stored in the PIN database and generating a message certifying their match or mismatch;

(k) updating the PIN database with the result of the authentication verification; and (l) informing a consumer of the result, and wherein generating visual representations in the form of visual data $y_P$ comprises generating encoded and/or encrypted data y based on the identification information m and secret key K, then modulating the encoded and/or encrypted data to form visual data $y_P$, and wherein generating identification information further comprises generating a codeword c, and generating a watermark sequence w, the watermark sequence w being combined with the codeword c resulting in the visual data $y_P$, said codeword c may contain any mixture of alphanumeric symbols of any font and size in any language or vector graphics components or any selected waveforms or objects from the predefined database of hosts, uncoded random waveforms or said coded waveforms according to selected information respectively secret key $m_1$ and $K_1$ associated with the product and representing visible data while information $m_2$ associated with the same product in the PIN database is considered to be embedded into the codeword c as a watermark based on a secret key $K_2$ using any suitable form of watermark coding based on Gel'fand-Pinsker or binning.

22. The method of claim 21 wherein said selected components for watermarking are chosen from the group of text structures, dots, lines, any symbologies, vector graphics components; wherein elements suitable for modulation are single characters, parts or zones of single characters divided in a known manner, groups of characters, dots or lines, vector graphics elements or known parts of them; wherein elements used for marking are selected based on any criteria in prevision of future accurate detection.

23. A method for the protection of products or the identification of their validity, expiration date or origin comprising the steps of:

(a) generating identification information m for a product to be protected;

(b) storing the generated identification information m in a product identification number (PIN) database, wherein said the PIN database comprises a database portion for authentication request data and/or user data;

(c) reproducing the generated identification information m on the product or on reproduction means attached to the product;

(d) acquiring, at any time when authenticity of said products is to be verified by a consumer, the identification information $\hat{m}$ from the product or from said reproduction means using a portable device;

(e) communicating the acquired identification information $\hat{m}$ over a communication channel to an entity having access to said PIN database, by formulating a request for authentication;

(f) verifying the acquired identification information $\hat{m}$ by comparison to the generated identification information m stored in the PIN database and generating a message certifying their match or mismatch;

(g) updating the PIN database with a result of the authentication verification;

(h) informing a consumer of the result;

(i) registering in said database portion times of requests for authentication and information about the requesting portable device;

(j) registering in said database portion the number of successful and unsuccessful authentication requests from the portable device for future bonuses, discounts, free communication services, phone ringtones, sounds, clips, or any other benefits from a frequent buying program; and (k) registering in said database portion consumer account information.

24. The method of claim 23 wherein said acquisition, processing and verification is performed directly on a portable device, or the acquired data are sent to an authentication server which performs said processing and verification and sends back the result of the authenticity verification to the portable device, or said acquisition and processing are performed on the portable device and the decoded data $\hat{m}$ are sent to the authentication server which performs verification and sends back the result of the authenticity verification, while the information identifying the requesting portable device, time, and/or other relevant information and the questioned product data $\hat{m}$ are jointly registered in a database of requests forming part of said PIN database.

25. The method of claim 23, wherein said request for authentication is sent to an address, preferably a service telephone number, URL address, e-email address or any other electronic pointer, reproduced on the product or any other attached reproduction means, this address being either unique for a given brand, group of products or publicly known to prevent false address attacks.

26. The method of claim 23, wherein the portable device is selected from a group of devices consisting of: a mobile phone, a personal digital assistant (PDA), a smartphone and a camera.

* * * * *